(12) United States Patent
Shimokawa

(10) Patent No.: US 6,603,512 B2
(45) Date of Patent: Aug. 5, 2003

(54) IMAGING APPARATUS AND CONTROL DEVICE THEREFOR TECHNICAL FIELD

(75) Inventor: Kikue Shimokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/020,955

(22) Filed: Feb. 9, 1998

(65) Prior Publication Data

US 2003/0090582 A1 May 15, 2003

Related U.S. Application Data

(63) Continuation of application No. PCT/JP97/02024, filed on Jun. 11, 1997.

(30) Foreign Application Priority Data

Jun. 11, 1996 (JP) .............................................. 8-149495

(51) Int. Cl.$^7$ ............................................. H04N 5/335
(52) U.S. Cl. ........................ 348/296; 348/314; 348/322
(58) Field of Search ................................. 348/312, 300, 348/302, 308, 294, 295, 157, 148, 296, 298, 222, 297; H04N 5/228

(56) References Cited

U.S. PATENT DOCUMENTS

| | | | | |
|---|---|---|---|---|
| 4,984,002 A | * | 1/1991 | Kokubo ...................... 348/296 |
| 5,157,502 A | * | 10/1992 | Nakajima et al. ........... 348/296 |
| 5,182,648 A | * | 1/1993 | Hirota ........................ 348/311 |
| 5,243,432 A | * | 9/1993 | An .............................. 348/296 |
| 5,289,022 A | * | 2/1994 | Iizuka et al. ................ 348/311 |
| 5,422,670 A | * | 6/1995 | Fukui .......................... 348/296 |
| 5,440,342 A | * | 8/1995 | Kannegundia ............... 348/294 |
| 5,512,950 A | * | 4/1996 | Watanabe et al. ........... 348/297 |
| 5,555,021 A | * | 9/1996 | Igarashi ...................... 348/222 |
| 5,576,762 A | * | 11/1996 | Udagawa .................... 348/296 |
| 5,614,949 A | * | 3/1997 | Suzuki et al. ............... 348/296 |
| 5,854,656 A | * | 12/1998 | Noggle ........................ 348/311 |
| 6,005,618 A | * | 12/1999 | Fukui et al. ................. 348/312 |
| 6,028,630 A | * | 2/2000 | Fukui et al. ................. 348/312 |

* cited by examiner

*Primary Examiner*—Wendy R. Garber
*Assistant Examiner*—Lin Ye
(74) *Attorney, Agent, or Firm*—Frommer Lawrence & Haug LLP; William S. Frommer

(57) ABSTRACT

A moving object 2 transferred by a transfer path 1 is detected by a position sensor 3 to generate a trigger pulse signal TRIG-IN of which pulse width can be adjustably set by a pulse width adjustable setting circuit 5 on the basis of a detection output of the position sensor 3 to deliver, to a CCD camera 10, modulated synchronizing signals T.G.-VD, T.G.-HD in which the trailing edge of the trigger pulse signal is caused to be timing of reference, which are generated in accordance with the trigger pulse signal TRIG-IN by a modulated HD signal preparation section 22 and a shutter control signal SHCLTL in which the leading edge of the trigger pulse signal TRIG-IN is caused to be timing of reference to allow it to carry out image pick-up operation of object for effective exposure time period corresponding to pulse width of trigger pulse signal TRIG-IN generated by the pulse width adjustable setting circuit 5, thereby making it possible to synchronize the image pick-up operation with a synchronizing signal of random period. In addition, continuous adjustable control of the exposure time period over broad range can be carried out.

14 Claims, 20 Drawing Sheets

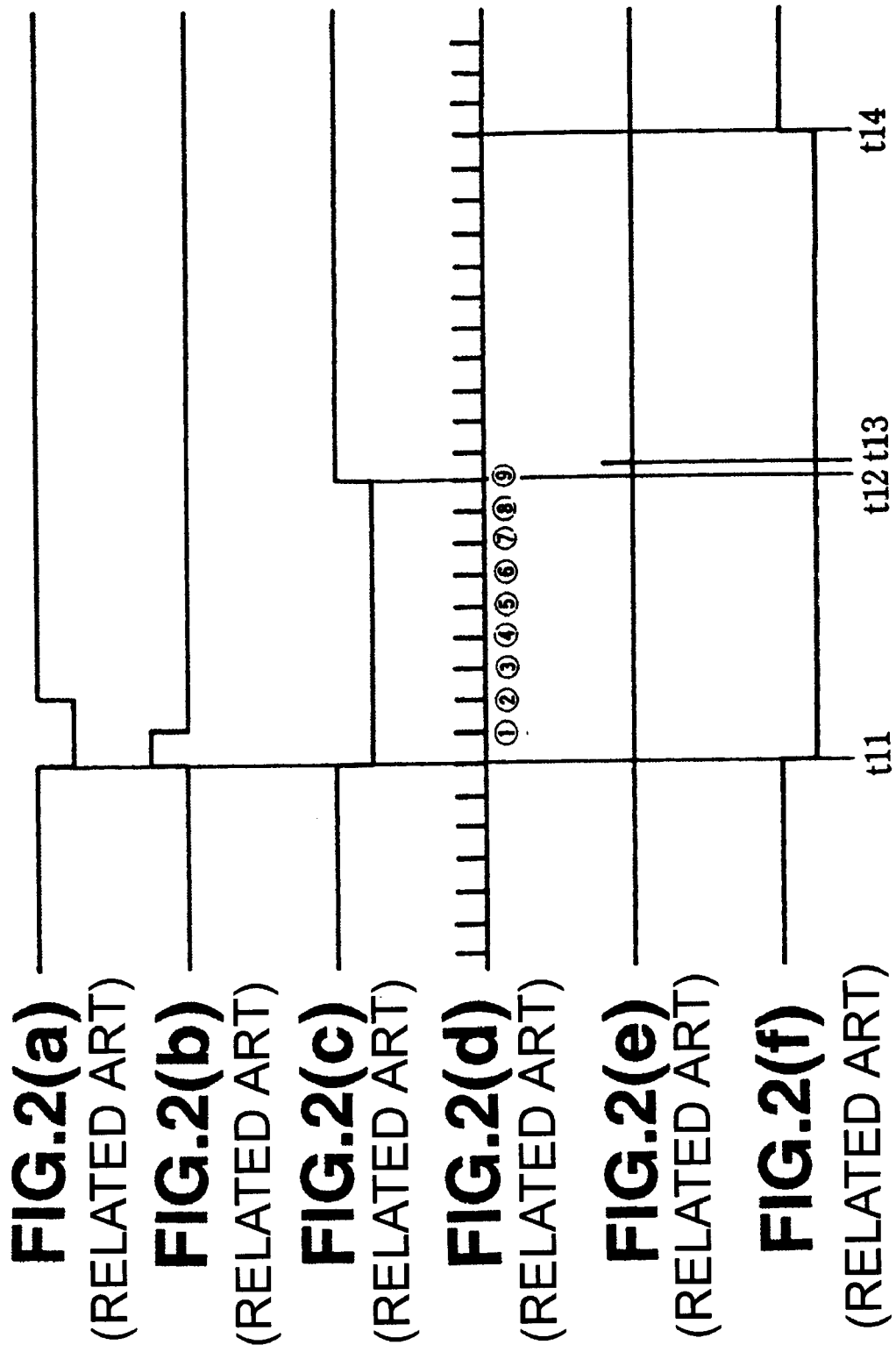

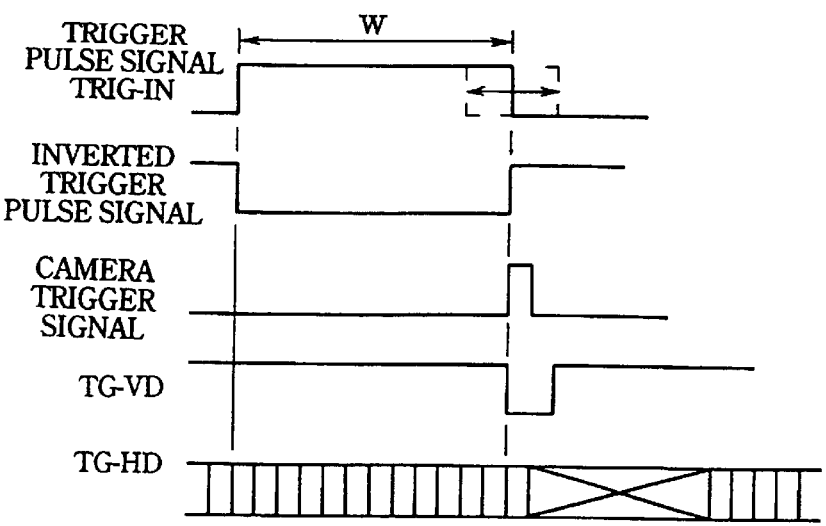
FIG.15(a) TRIGGER PULSE SIGNAL TRIG-IN
FIG.15(b) INVERTED TRIGGER PULSE SIGNAL
FIG.15(c) CAMERA TRIGGER SIGNAL
FIG.15(d) TG-VD
FIG.15(e) TG-HD
FIG.15(f) 1-ST SHUTTER CONTROL SIGNAL
FIG.15(g) 2-ND SHUTTER CONTROL SIGNAL
FIG.15(h) READ-OUT SIGNAL

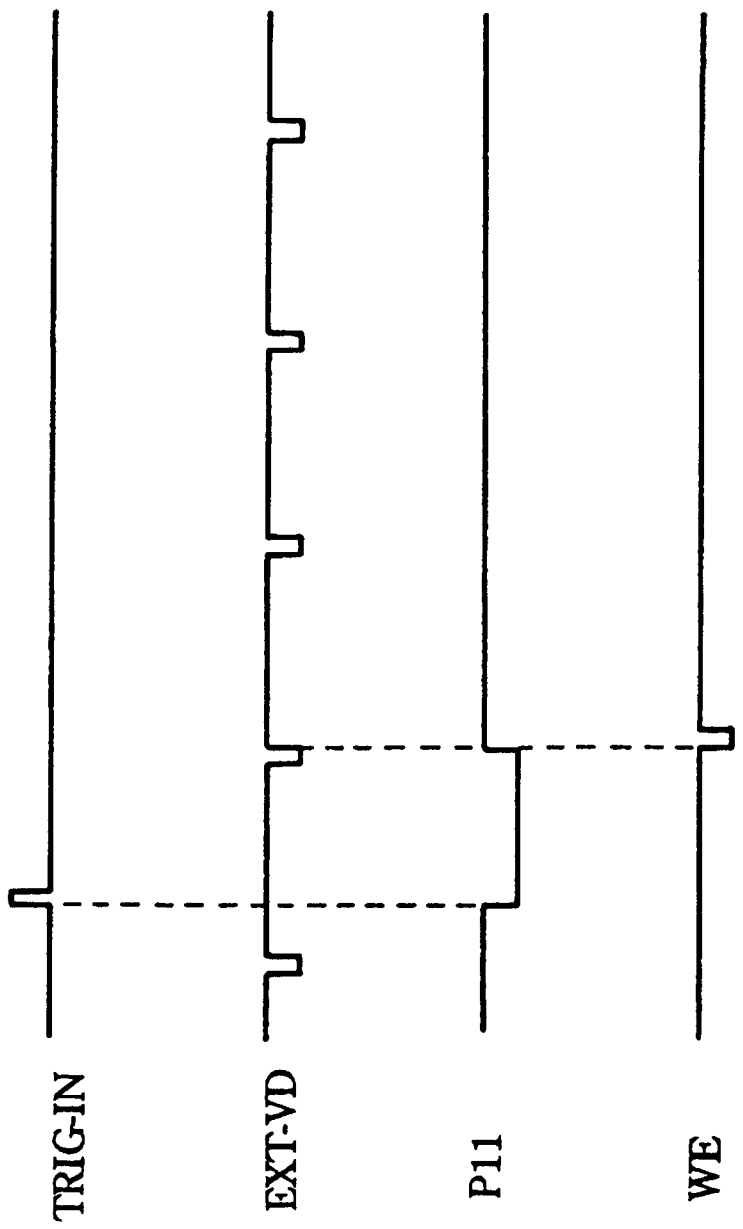

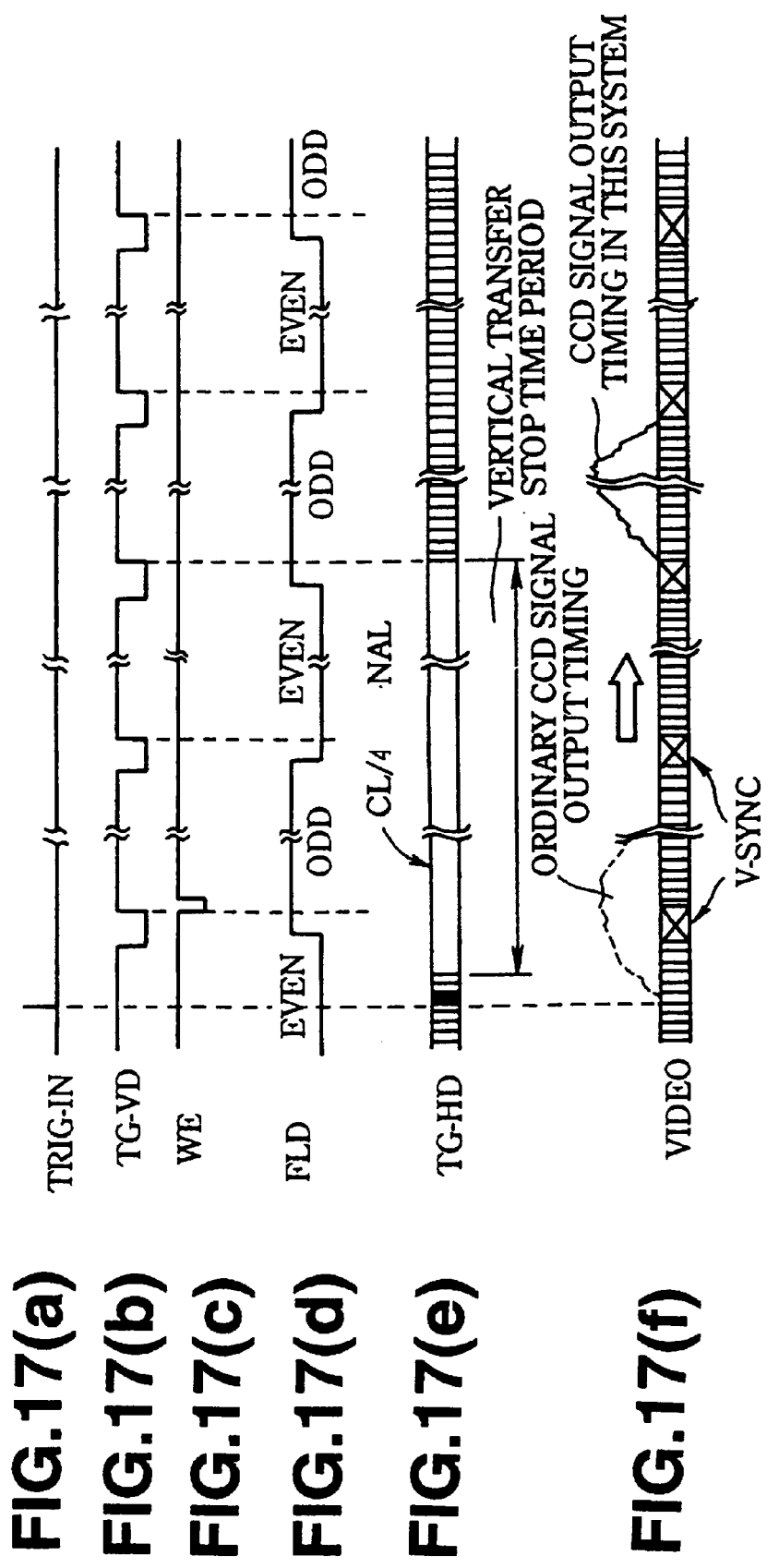

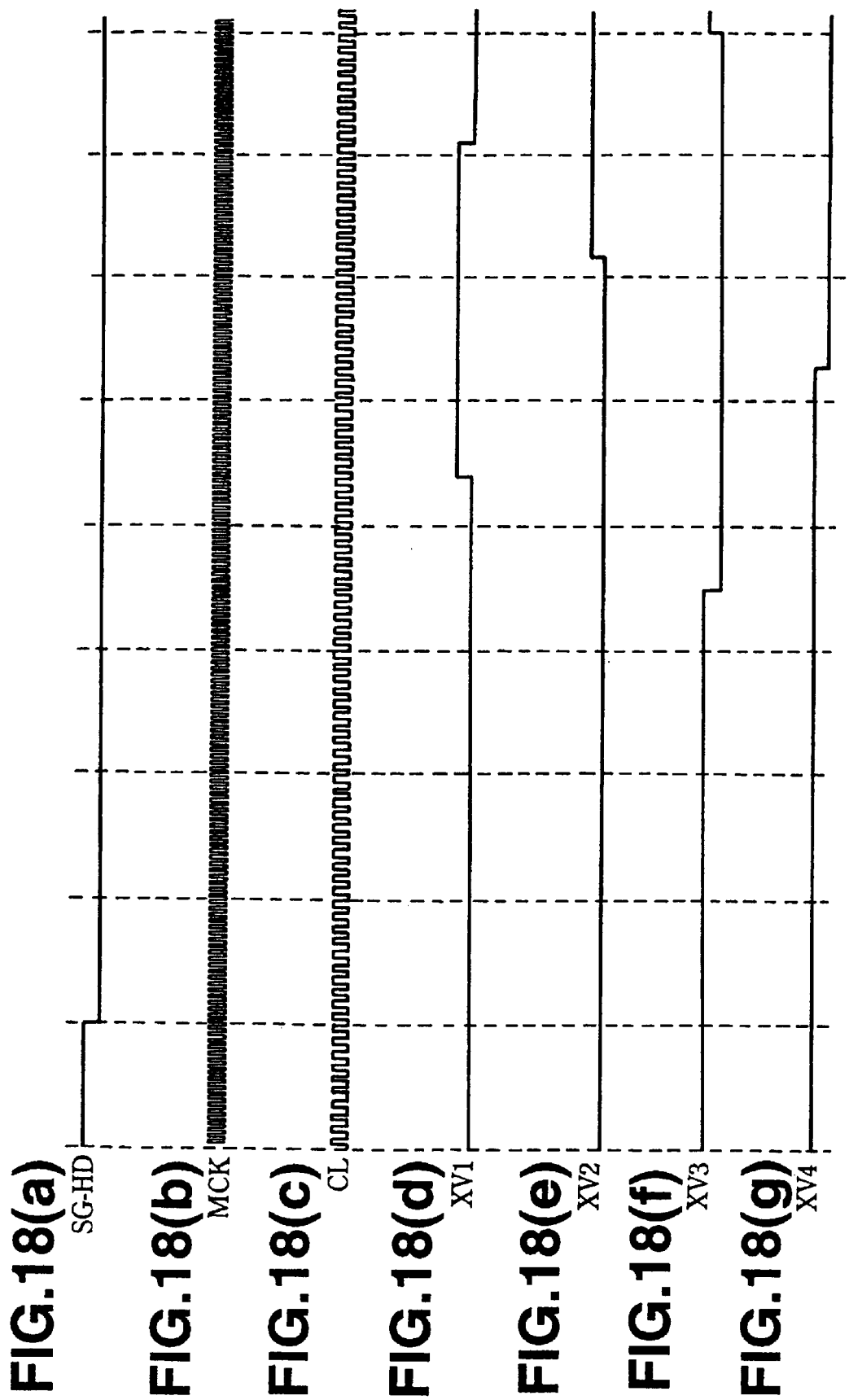

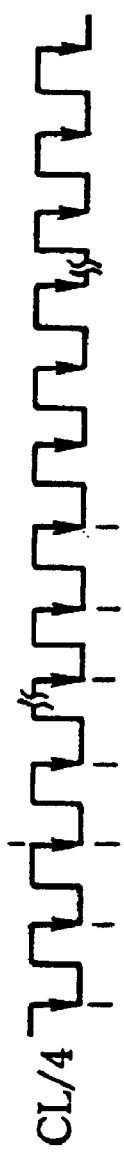
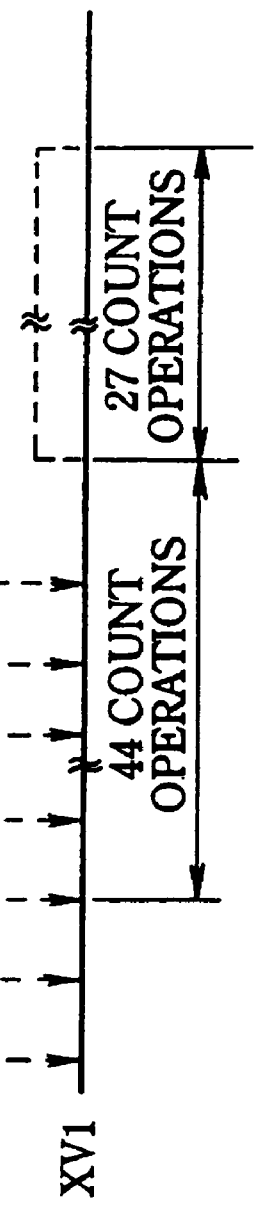
FIG.19(a)
FIG.19(b)
FIG.19(c)

IMAGING APPARATUS AND CONTROL DEVICE THEREFOR TECHNICAL FIELD

This is a continuation of copending International Application PCT/JP97/02024 having an international filing date of Jun. 11, 1997.

TECHNICAL FIELD

This invention relates to an imaging apparatus for Factory Automation (FA) suitable for carrying out imaging operation of, e.g., object moving at high speed, and a control device therefor.

BACKGROUND ART

The applicant of this application has proposed, in the Japanese Patent Application Laid Open No. 119776/1992, an imaging apparatus having electronic shutter function, which is adapted for controlling charge storage time of a solid-state image pick-up device (CCD image sensor) of the IT (Interline Transfer) type to thereby carry out exposure time adjustment without use of mechanical iris. In this imaging apparatus, the shutter speed can be changed in dependency upon movement of object by using the electronic shutter function. This imaging apparatus is advantageous particularly in taking thereinto picture image in high speed moving body.

In such an imaging apparatus, e.g., used mainly for FA and adapted for carrying out image pick-up operation of moving object, e.g., a configuration as shown in FIG. 1 is employed. When an object 201 moving on a movement path 200 has moved to the front portion of an image pick-up section 202, a position detecting section 203 detects this to deliver, to a shutter signal generating circuit 204, a trigger signal which falls to low level at time t11 of FIG. 2(a).

The shutter signal generating circuit 204 is operative so that when the trigger signal is delivered thereto, it delivers, to a CCD control circuit 205, a shutter signal which rises at time t11 of FIG. 2(b). The CCD control circuit 205 is operative so that when the shutter signal is delivered thereto, it stops supply of a shutter control signal for sweeping out electric charges (hereinafter simply referred to as charges) stored at the photo-electric converting section of the CCD image sensor 206 into the overflow drain. Thus, effective charges begin to be stored into respective pixels of the photo-electric converting section of the CCD image sensor 206.

The CCD control circuit 205 is supplied with a vertical synchronizing signal which falls at time t11 and rises at time t12 of FIG. 2(c) and a horizontal synchronizing signal shown in FIG. 2(d) from a synchronizing signal generating circuit 207. The CCD control circuit 205 is operative so that when the shutter control signal is delivered thereto, it carries out nine (9) count operations of pulses (i.e. counts nine (9) pulses) of the horizontal synchronizing signal shown in FIG. 2(d) from the time t11 at which the vertical synchronizing signal shown in FIG. 2(c) falls thereafter to carry out several hundred count operations of clock pulses thereafter to deliver a read-out signal to the CCD image sensor 206 at time t13 shown in FIG. 2(e).

Thus, for a time period from the time when the shutter control signal is delivered to the CCD image sensor 206 at time t11 of FIG. 2(b) until the read-out signal is delivered to the CCD image sensor 206 at time t13 of FIG. 2(e), charges corresponding to image pick-up light irradiated through an imaging (image pick-up) lens 208 are stored in the CCD image sensor 206. The time period from the time t11 to the time t13 is charge storage time.

In this case, FIG. 2(f) indicates vertical blanking period VBLK.

The charges which have been read out from the CCD image sensor 206 are delivered to a signal processing circuit 209 as an image pick-up signal. The signal processing circuit 209 implements, to the image pick-up signal, a signal processing to add synchronizing signal, etc. to output it as a video signal through an output terminal 210. The video signal outputted through the output terminal 210 is delivered to, e.g., monitor. Thus, it is possible to analyze the state of the object 201 in the case where the object 201 is caused to be moved.

Since such an imaging apparatus for carrying out image pick-up operation of moving object is mainly used for FA, there are instances where the object 201 shown in FIG. 1 is caused to be moved at high speed and imaging is desired to be carried out by high speed shutter, e.g., 1/10000 sec. etc.

However, in the above-mentioned imaging apparatus, nine count operations of pulses of the horizontal synchronizing signal are carried out from, e.g., falling of the vertical synchronizing signal thereafter to deliver a read-out signal to the CCD image sensor at the timing when several hundreds of clock pulses have been counted. Namely, the output timing of the read-out signal is fixedly set in advance on the basis of the pixel arrangement of the CCD image sensor.

Accordingly, the charge storage time of the imaging apparatus could not be shortened down to a value required from the falling time of the vertical synchronizing signal to the time when the read-out signal is outputted. For this reason, the conventional imaging apparatus did not carry out image pick-up operation by high speed shutter such as 1/1000 sec., etc.

The imaging apparatus starts storage of effective charges in dependency upon trigger signal delivered from the position detecting section 203 as described above. Namely, the imaging apparatus becomes operative in dependency upon the timing of the trigger signal delivered from the position detecting section 203. When a trigger signal is delivered at an arbitrary timing as shown in FIG. 3(a), for example, the imaging apparatus delivers a read-out signal shown in FIG. 3(b) to the CCD image sensor after a predetermined charge storage time, i.e., exposure time to read out the charges stored in respective pixels of the photoelectric converting section to the vertical transfer section and to generate, at the same time, a vertical synchronizing signal V-SYNC to output the charges which have been read out to the vertical transfer section as an image pick-up signal through a horizontal transfer section in the state synchronized with the vertical synchronizing signal V-SYNC thus generated.

Moreover, the applicant of this application has proposed, in the Japanese Patent Application Laid Open No. 1525502/1994, an imaging system adapted to generate a modulated synchronizing signal on the basis of a trigger signal generated at an arbitrary timing, thereby making it possible to carry out image pick-up operation by high speed shutter such as 1/1000 sec., etc in the state synchronized with the synchronizing signal of random period.

Meanwhile, in the conventional imaging system as described above, image pick-up operation by high speed shutter can be carried out, but the exposure time period cannot be adjustably set in succession over a broad range.

Thus, an object of this invention is to provide an imaging apparatus which is capable of carrying out image pick-up operation in synchronism with synchronizing signal of random period, and which permits continuous adjustable control of the exposure time period over a broad range, and a control device therefor.

DISCLOSURE OF THE INVENTION

An imaging apparatus according to this invention comprises: a solid-state image pick-up device including light receiving means adapted for producing charges corresponding to quantity of light incident thereto, vertical transfer means to which charges produced at the light receiving means are transferred, horizontal transfer means for outputting the charges transferred through the vertical transfer means, and a charge sweep-out section for sweeping out the charges stored at the light receiving means in accordance with a shutter control signal; trigger signal generating means for generating a trigger signal; pulse width adjustable setting means for generating, on the basis of input timing of the trigger signal, a trigger pulse signal of which pulse width can be adjustably set; signal generating means for outputting a shutter control signal in which the leading edge of the trigger pulse signal is caused to be timing of reference and a synchronizing signal in which the trailing edge of the trigger pulse signal is caused to be timing of reference; drive signal generating means for outputting, on the basis of timing of the synchronizing signal, a read-out signal for transferring the charges stored at the light receiving means to the vertical transfer means and a transfer signal for outputting, through the horizontal transfer means, the charges which have been read out to the vertical transfer means; and drive means for driving the solid-state image pick-up device on the basis of the shutter control signal, the read-out signal and the transfer signal, thus to carry out image pick-up operation of object for an effective exposure time period corresponding to pulse width of the trigger pulse signal.

Moreover, an imaging apparatus according to this invention comprises: a solid-state image pick-up device including light receiving means adapted for producing charges corresponding to quantity of light incident thereto, vertical transfer means to which the charges produced at the light receiving means are transferred, horizontal transfer means for outputting the charges transferred through the vertical transfer means, and charge sweep-out means for sweeping out the charges stored at the light receiving means in accordance with a control signal; trigger signal generating means for outputting a trigger signal; pulse width adjustable setting means for generating, on the basis of input timing of the trigger signal, a trigger pulse signal of which pulse width can be adjustably set; signal generating means for outputting a first shutter control signal generated on the basis of timing of the trailing edge of the trigger pulse signal, a second shutter control signal generated on the basis of timing of the leading edge of the trigger pulse signal and a synchronizing signal generated on the basis of timing of the trailing edge of the trigger pulse signal; signal selector means for selectively outputting one of the first shutter control signal and the second shutter control signal; drive signal generating means for generating, on the basis of the synchronizing signal, a read-out signal for transferring the charges stored at the light receiving means to the vertical transfer means and a transfer signal for outputting, through the horizontal transfer means, the charges which have been read out to the vertical transfer means; and drive means for driving the solid-state image pick-up device on the basis of the first shutter control signal or the second shutter control signal selected by the signal selector means, the read-out signal and the transfer signal.

A control device for an imaging apparatus according to this invention includes: detector means for detecting an object to output a detection signal; pulse width adjustable setting means for outputting, on the basis of the detection signal, a trigger pulse signal of which pulse width can be adjustably set; and signal generating means for generating a shutter control signal in which the leading edge of the trigger pulse signal is caused to be timing of reference and a synchronizing signal in which the trailing edge of the trigger pulse signal is caused to be timing of reference to deliver the synchronizing signal and the shutter control signal to the imaging apparatus to allow it to carry out image pick-up operation for exposure time period corresponding to pulse width of the trigger pulse signal.

In addition, a control device for an imaging apparatus according to this invention comprises: detector means for detecting an object to output a detection signal; pulse width adjustable setting means for generating, on the basis of the detection signal, a trigger pulse signal of which pulse width can be adjustably set; signal generating means for outputting a first shutter control signal generated on the basis of timing of the trailing edge of the trigger pulse signal, a second shutter control signal generated on the basis of timing of the leading edge of the trigger pulse signal and a synchronizing signal generated on the basis of timing of the trailing edge of the trigger pulse signal; and signal selector means for selectively outputting one of the first shutter control signal and the second shutter control signal to deliver, to the imaging apparatus, the synchronizing signal and the first shutter control signal or the second shutter control signal.

BRIEF DESCRIPTION OF THE DRAWINGS

FIG. 2 is a time chart showing the operation of the conventional imaging apparatus.

FIG. 15 is a time chart showing the operation of the modulated HD signal generator.

FIG. 16 is a time chart showing the operation of the write enable signal preparation section.

FIG. 17 is a time chart showing the operation of the control unit.

FIG. 18 is a time chart showing the operation of the timing generator.

FIG. 19 is a time chart showing the operation in vertical transfer stop time period of the timing generator.

BEST MODE FOR CARRYING OUT THE INVENTION

The best mode for carrying out this invention will now be described with reference to the attached drawings.

Figure 1:
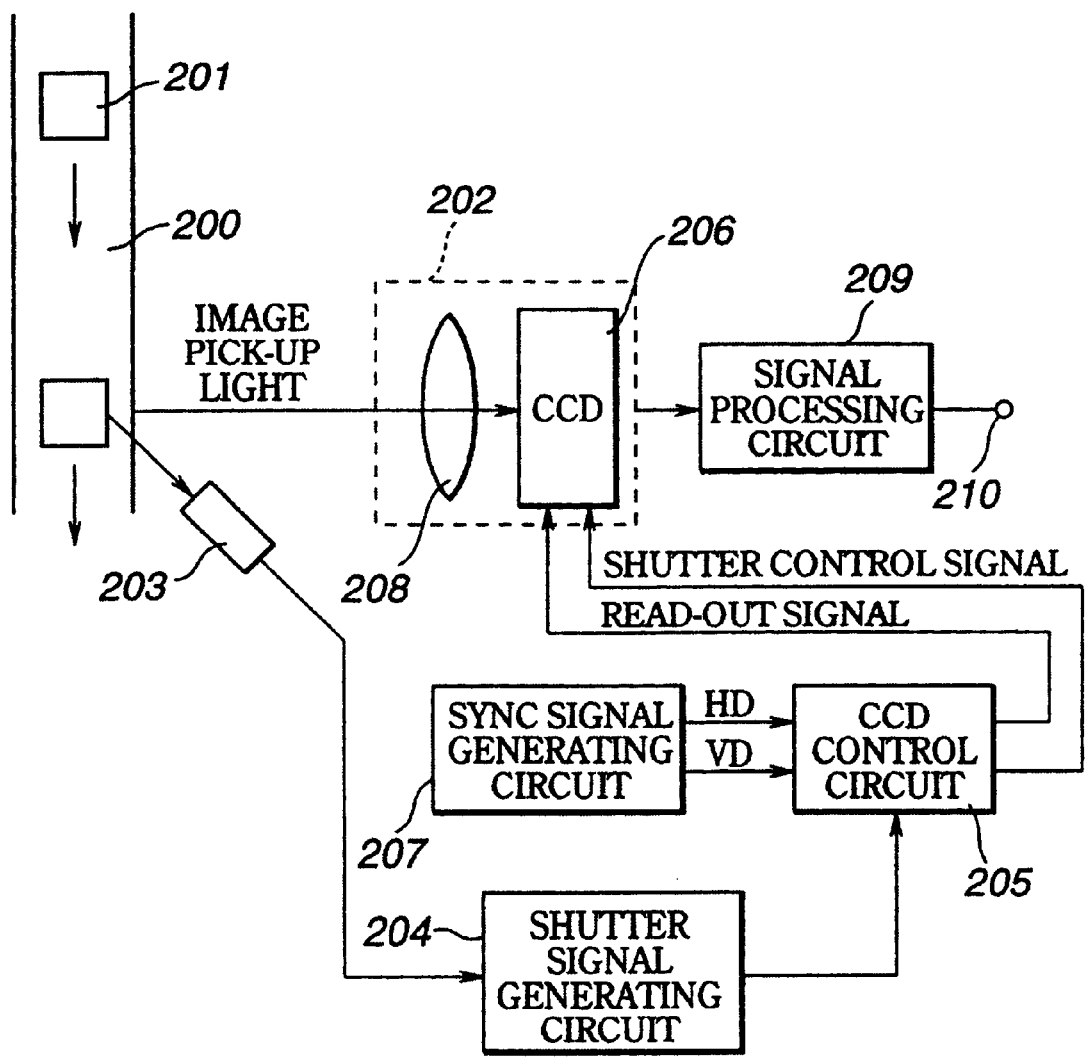
FIG. 1 is a block diagram showing the configuration of a conventional imaging apparatus.
Figures 3A, 3B, 3C:
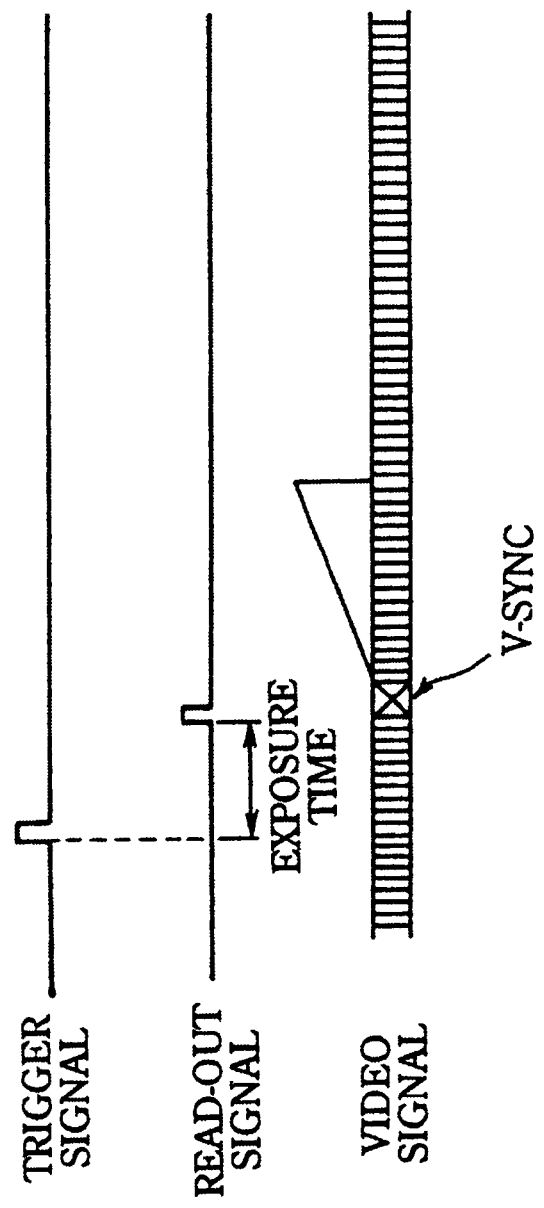
FIG. 3 is a time chart showing image pick-up operation synchronized with trigger pulse signal in the conventional imaging apparatus.
Figure 4:
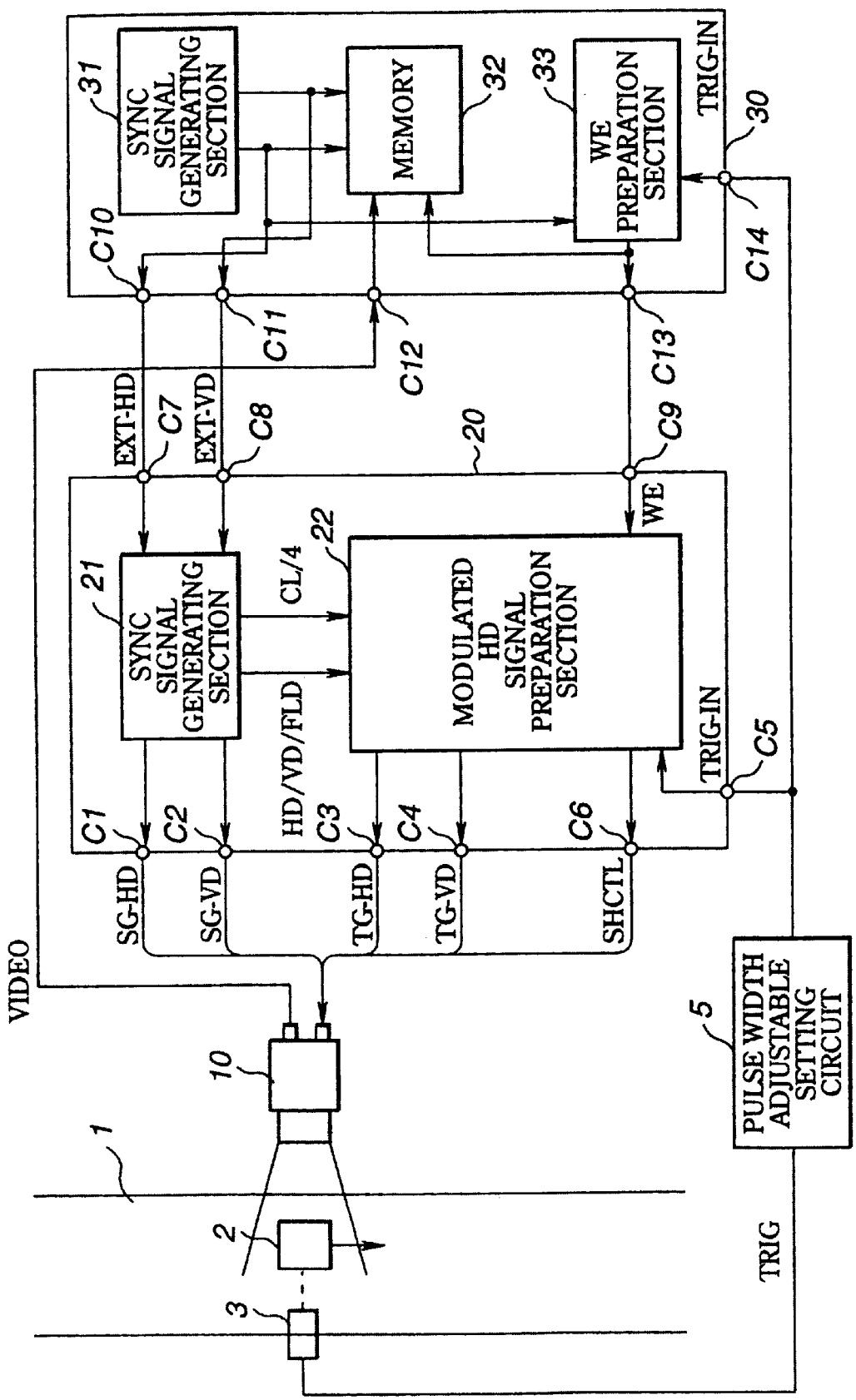
FIG. 4 is a block diagram showing the configuration of an imaging system to which this invention is applied.

An imaging apparatus and a control device according to this invention are applied to, e.g., an imaging system as shown in FIG. 4.

This imaging system is directed to an imaging system adapted for detecting, by a position sensor 3, a moving object 2 transferred by a transfer path 1 comprised of, e.g., belt conveyer, etc. to pick up image of still picture on the basis of detection output of the position sensor 3, and includes a pulse width adjustable setting circuit 5 for generating a trigger pulse signal TRIG-IN on the basis of detection output of the position sensor 3, an imaging apparatus composed of a CCD camera 10 for carrying out image pick-up operation in accordance with trigger pulse signal TRIG-IN generated by the pulse width adjustable setting circuit 5 to output a video signal and a control unit 20 for carrying out control of the operation of the CCD camera 10, and a picture taking-in unit 30 for delivering external synchronizing signals EXT-HD, EXT-VD to the control unit 20 and for taking whereinto a video signal from the CCD camera 10.

In this imaging system, the position sensor 3 detects the moving object 2 transferred by the transfer path 1, whereby when the moving object 2 reaches the front portion of the position sensor 3, it generates a trigger signal TRIG as its arrival position detection signal to deliver this trigger signal TRIG to the pulse width adjustable setting circuit 5.

Figure 5:
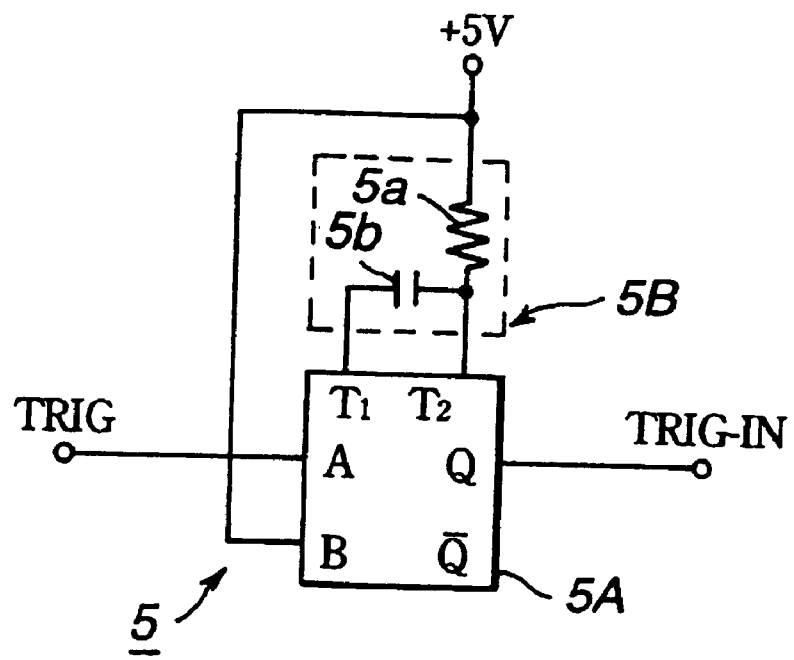
FIG. 5 is a circuit diagram showing more practical example of the configuration of pulse width adjustable setting circuit in the imaging system.
Figure 6:
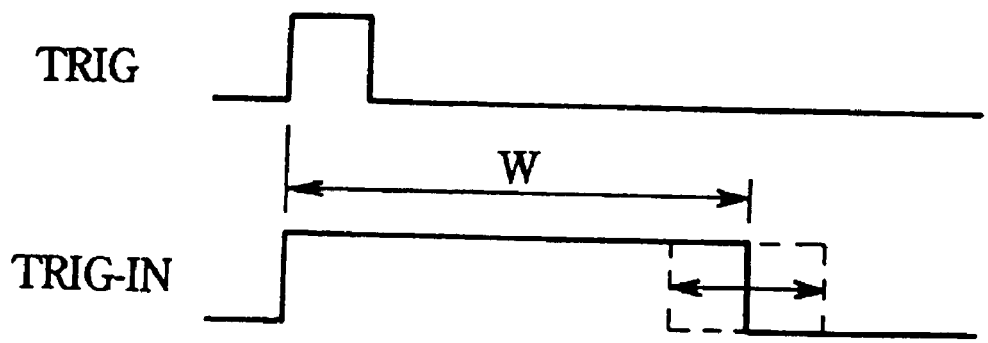
FIG. 6 is a time chart showing the operation of the pulse width adjustable setting circuit.

The pulse width adjustable setting circuit 5 is composed, as its more practical example of the configuration is shown in FIG. 5, of a mono-multi vibrator 5A, and a time constant circuit 5B composed of a semifixed resistor 5a and a capacitor 5b which are externally connected to the mono-multi vibrator 5A. In this pulse width adjustable setting circuit 5, the mono-multi vibrator 5A is triggered by a trigger signal TRIG from the position sensor 3 to thereby generate a trigger pulse signal TRIG-IN of pulse width W corresponding to time constant of the time constant circuit 5B as shown in FIG. 6. The pulse width W of the trigger pulse signal TRIG-IN corresponding to the time constant of the time constant circuit 5B can be adjustably set in succession by the semifixed resistor 5a.

Further, the pulse width adjustable setting circuit 5 delivers, to the control unit 20 and the picture taking-in unit 30, the trigger pulse signal TRIG-IN generated in accordance with a detection output signal from the position sensor 3.

The control unit 20 controls timing of exposure at the CCD camera 10 on the basis of the trigger pulse signal TRIG-IN delivered from the pulse width adjustable setting circuit 5, and controls the timing at which the CCD camera 10 outputs a video signal on the basis of a write enable signal WE delivered from the picture taking-in unit 30.

The CCD camera 10 picks up image of a moving object on the basis of control from the control unit 20 to output a video signal at a timing based on the control from the control unit 20 to deliver it to the picture taking-in unit 30. The picture taking-in unit 30 takes whereinto the video signal from the CCD camera 10.

In more practical sense, the control unit 20 comprises terminals C1, C2 from which horizontal and vertical synchronizing signals SG-HD, SG-VD are respectively delivered to the CCD camera 10, terminals C3, C4 from which horizontal and vertical modulated synchronizing signals T.G.-HD, T.G.-VD are respectively delivered to the CCD camera 10, a terminal C5 to which trigger pulse signal TRIG-IN based on detection of the moving object 2 by the position sensor 3 is delivered from the pulse width adjustable setting circuit 5, and a terminal C6 from which shutter control signal SHCTL generated on the basis of the trigger pulse signal TRIG-IN delivered to the terminal C5 is delivered to the CCD camera 10.

Moreover, the control unit 20 comprises terminals C7, C8 to which external synchronizing signals EXT-HD, EXT-VD are respectively delivered from the picture taking-in unit 30, a terminal C9 to which write enable signal WE is delivered from the picture taking-in unit 30, a synchronizing signal generating section 21 for generating synchronizing signals SG-HD, SG-VD on the basis of external synchronizing signals EXT-HD, EXT-VD delivered from the picture taking-in unit 30 to the terminals C7, C8 to output the synchronizing signals SG-HD, SG-VD thus generated to the terminals C1, C2, and a modulated HD signal preparation section 22 for preparing modulated synchronizing signals T.G.-HD, T.G.-VD on the basis of the synchronizing signals SG-HD, SG-VD from the synchronizing signal generating section 21 and the write enable signal WE, etc. delivered to the terminal C9 to respectively output the modulated synchronizing signals T.G.-HD, T.G.-VD thus prepared to the terminals C3, C4, and to prepare a shutter control signal SHCTL on the basis of the trigger pulse signal TRIG-IN delivered to the terminal C5 to output it to the terminal C6.

Further, the synchronizing signal generating section 21 generates horizontal and vertical synchronizing signals SG-HD, SG-VD in accordance with external synchronizing signals EXT-HD, EXT-VD delivered from the terminals C7, C8 to deliver them to the CCD camera 10 through the terminals C1, C2.

Further, the modulated HD signal preparation section 22 generates, in accordance with the timing of the trigger pulse signal TRIG-IN delivered from the terminal C5, a modulated horizontal synchronizing signal T.G.-HD and a modulated vertical synchronizing signal T.G.-VD which are based on the synchronizing signals SG-HD, SG-VD and the write enable signal WE to deliver them to the CCD camera 10 through the terminals C3, C4. In addition, the modulated HD signal preparation section 22 adjusts frequency of the modulated horizontal synchronizing signal T.G.-HD in dependency upon set shutter speed to control the exposure time, i.e., the charge storage time of the CCD camera 10, and to control output of video signal from the CCD camera 10 so that video signal from the CCD camera 10 is delivered to the picture taking-in unit 30 at timing synchronized with the write enable signal WE delivered to the terminal C9.

The picture taking-in unit 30 comprises terminals C10, C11 from which external synchronizing signals EXT-HD, EXT-VD are outputted, a terminal C12 to which video signal is delivered from the CCD camera 10, a terminal C13 from which the write enable signal WE is outputted, a terminal C14 to which the above-described trigger pulse signal TRIG-IN is delivered from the position sensor 3, a synchronizing signal generating section 31 for generating external synchronizing signals EXT-HD, EXT-VD, a memory 32 for storing video signal delivered to the terminal C12, and a write enable signal preparation section 33 for generating write enable signal WE on the basis of the trigger pulse signal TRIG-IN delivered to the terminal C14 to deliver the write enable signal WE thus generated to the control unit 20 through the terminal C13.

Further, the synchronizing signal generating section 31 generates external horizontal synchronizing signal EXT-HD and external vertical synchronizing signal EXT-VD to deliver these synchronizing signals to the memory 32 and to deliver them to the control unit 20 through the terminals C10, C11. The write enable signal preparation section 33 generates write enable signal WE in accordance with trigger pulse signal TRIG-IN delivered to the terminal C14 to deliver this signal to the memory 32 and to deliver it to the control unit 20 through the terminal C13. The memory 32 stores video signal delivered from the CCD camera 10 to the terminal C12 in accordance with the write enable signal from the write enable signal preparation section 32.

Figure 7:
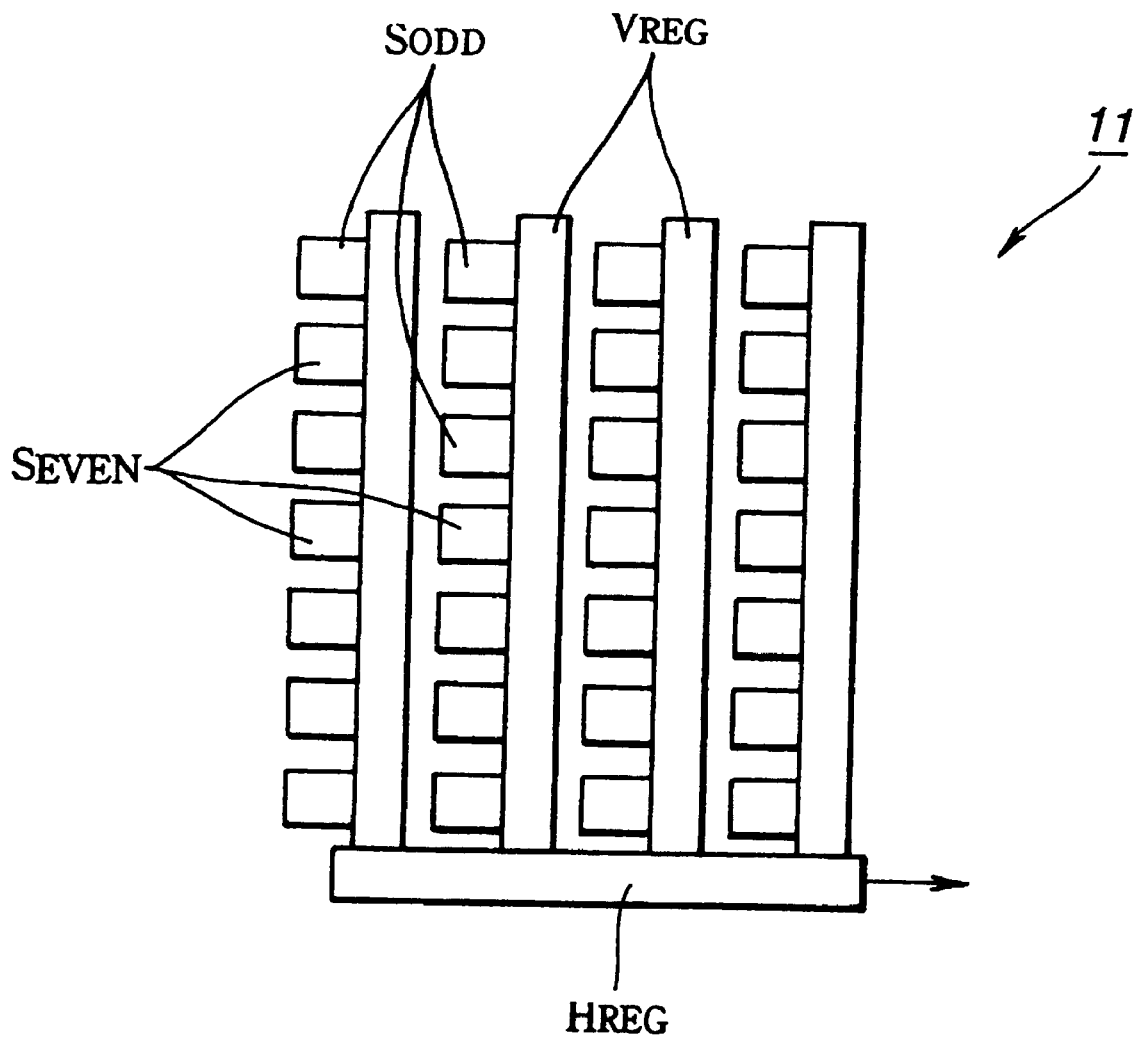
FIG. 7 is a plan view showing, in a model form, the structure of CCD image sensor used for CCD camera in the imaging system.

Further, the CCD camera 10 comprises an IT (Intrelddine Transfer) type CCD image sensor 11 of a structure as shown in FIG. 7, for example. This IT type CCD image sensor 11 is composed of light receiving portions $S_{ODD}$ corresponding to respective pixels of the odd field, light receiving portions $S_{EVEN}$ corresponding to respective pixels of the even field, vertical transfer sections $V_{REG}$ to which charges stored in the respective light receiving portions $S_{ODD}$, $S_{EVEN}$ are read out, and a horizontal transfer section $H_{REG}$ for outputting the charges which have been read out to the vertical transfer portion $V_{REG}$ as an image pick-up signal of one horizontal line unit, and has an electronic shutter function to control potential of the substrate formed below the light receiving portions $S_{ODD}$, $S_{EVEN}$ to thereby sweep out the charges which have been stored in the respective light receiving portions $S_{ODD}$, $S_{EVEN}$ into the substrate thus to control the charge storage time.

Figure 8:
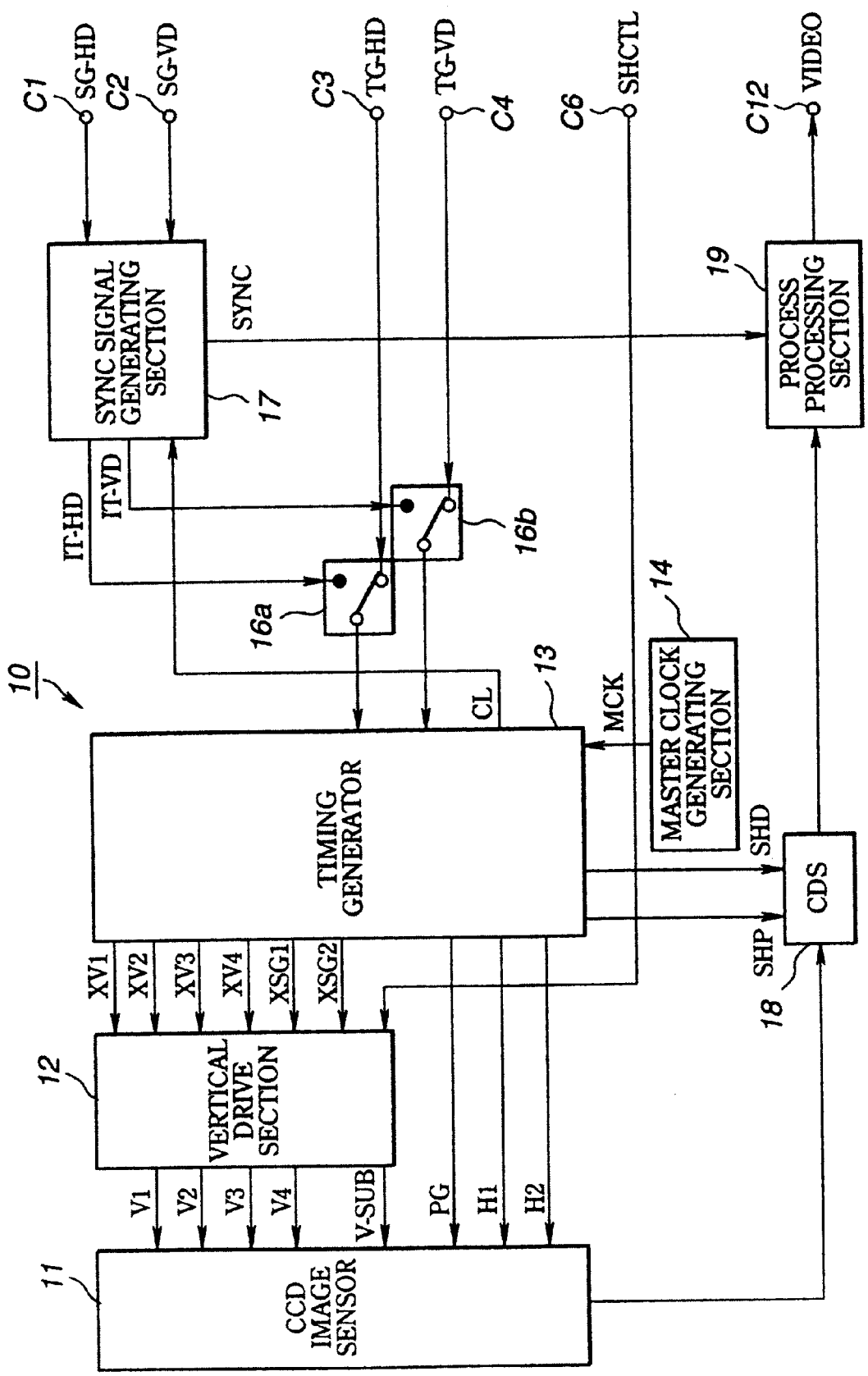
FIG. 8 is a block diagram showing the configuration of the CCD camera.

Further, this CCD camera 10 comprises, as shown in FIG. 8, a vertical drive section 12 for controlling transfer of charges in the vertical transfer section to which charges stored in the light receiving portions of the CCD image sensor 11 are read out, a timing generator 13 which generates a signal for driving the vertical drive section 12, etc., and a master clock generating section 14 for delivering master clock MCK of about 28.6 MHZ to the timing generator 13.

Further, this CCD camera 10 comprises switches 16a, 16a for respectively carrying out switching between horizontal synchronizing signals IT-HD/T.G.-HD delivered to the timing generator 13 and switching between vertical synchronizing signals IT-VD/T.G.-VD delivered thereto, a synchronizing signal generating section 17 for generating internal synchronizing signals IT-HD, IT-VD on the basis of the horizontal synchronizing signal SG-HD and the vertical synchronizing signal SG-VD delivered from the terminals C1, C2, a Correlated Double Sampling circuit (hereinafter simply referred to as CDS circuit) 18 for carrying out, on the basis of sampling pulses SHP, SHD delivered from the timing generator 13, the so-called correlated double sampling with respect to image pick-up signal delivered from the CCD image sensor 11 to remove noise such as reset noise, etc. included in the image pick-up signal, and a process processing section 19 operative on the basis of the synchronizing signal SYNC delivered from the synchronizing signal generating section 17 to implement the so-called process processing to the image pick-up signal delivered from the CDS circuit 18 to output a processed signal thus obtained as a video signal.

In this CCD camera 10, switching operations of the above-described switches 16a, 16b are carried out to thereby carry out switching between the ordinary operation mode for carrying out image pick-up operation of moving picture on the basis of the internal synchronizing signals IT-HD, IT-VD from the timing generator 13 and the random shutter mode for carrying out image pick-up operation of still picture in accordance with the shutter control signal SHCTL delivered from the terminal C6 and the modulated synchronizing signals T.G.-HD, T.G.-VD delivered to the terminals C3, C4.

In more practical sense, the synchronizing signal generating section 17 generates internal synchronizing signals IT-HD, IT-VD from the horizontal synchronizing signal SG-HD delivered from the terminal C1 and the vertical synchronizing signal SG-VD delivered from the terminal C2 to deliver them to the switches 16a, 16b. The switch 16a selectively delivers, to the timing generator 13, one of the modulated horizontal synchronizing signal T.G.-HD delivered from the terminal C3 and the internal horizontal synchronizing signal IT-HD delivered from the synchronizing signal generating section 17, and the switch 16b selectively delivers, to the timing generator 13, one of the modulated vertical synchronizing signal T.G.-VD delivered from the terminal C4 and the internal vertical synchronizing signal IT-VD delivered from the synchronizing signal generating section 17.

When this imaging system is operative in the random shutter mode, horizontal and vertical synchronizing signals T.G.-HD, T.G.-VD delivered to the terminals C3, C4 are delivered to the timing generator 13 through the switches 16a, 16b.

Further, in this timing generator 13, after a predetermined number of count operations, e.g., 9 times of count operations of the modulated horizontal synchronizing signal T.G.-HD are conducted from the timing of the falling edge of the modulated vertical synchronizing signal T.G.-VD synchronous with the trailing edge of the trigger pulse signal TRIG-IN, a read-out signal for reading out charges stored in the light receiving portions of the CCD image sensor 11 to the vertical transfer section of the CCD image sensor 11 is formed. Moreover, in the CCD image sensor 11, charge sweep-out pulses are superimposed on signal V-SUB for controlling voltage of the substrate by the vertical drive section 12 every timing of the shutter control signal SHCTL delivered from the modulated HD signal preparation section 22 of the control unit 20. Thus, charges stored in respective pixels of the light receiving portions are swept out into the substrate. Accordingly, the time period from the timing when charges stored in the respective pixels of the light receiving portions are last swept out into the substrate up to the timing of the read-out signal is the effective exposure time period.

Figure 9:
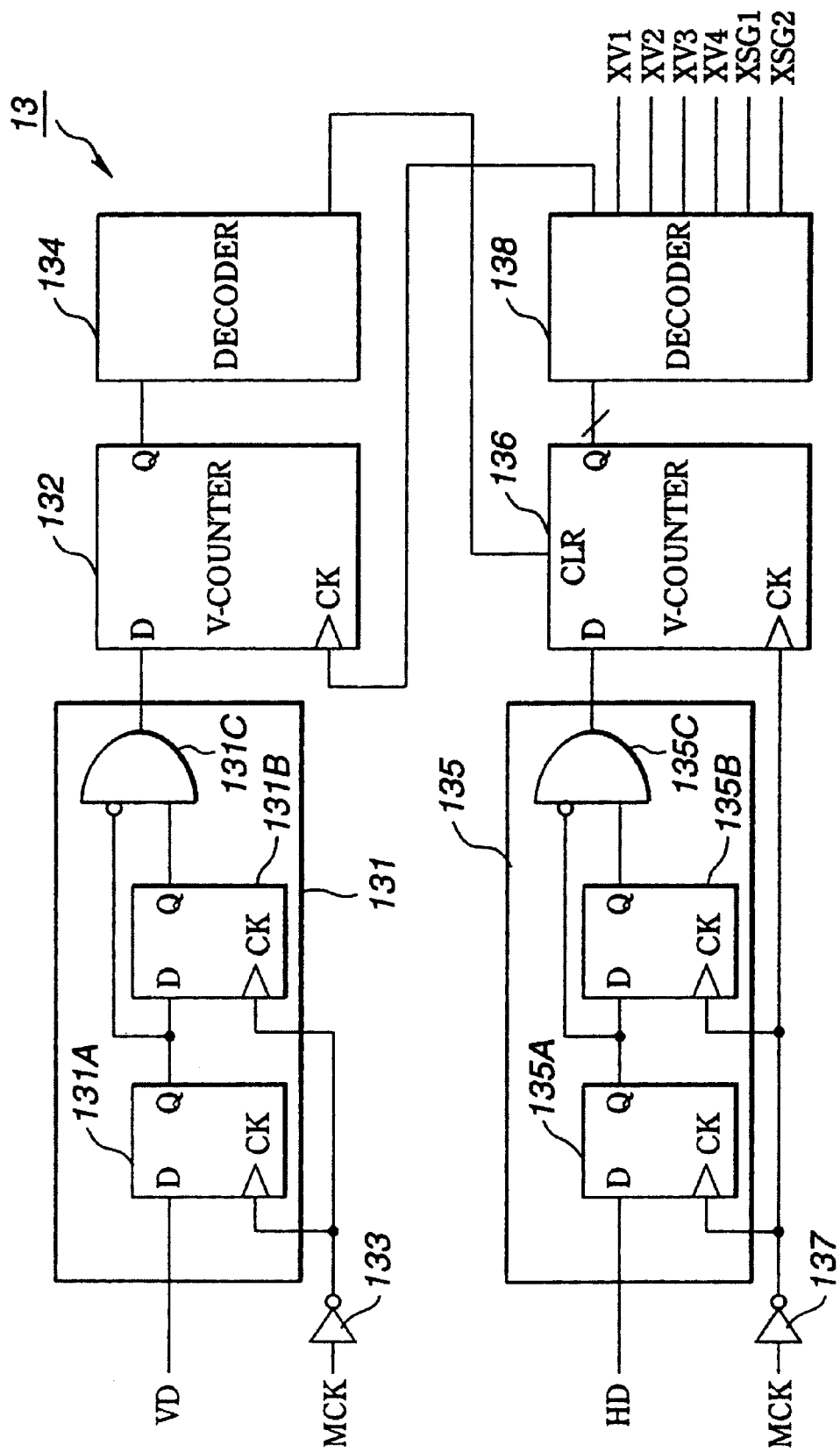
FIG. 9 is a block diagram showing the configuration of timing generator in the CCD camera.

In this example, the timing generator 13 is constituted as shown in FIG. 9, for example. Namely, the timing generator 13 is composed of an edge detection circuit 131 supplied with the vertical synchronizing signal T.G.-VD/IT-VD selected by the switch 16b, a V-counter 132 having data input terminal supplied with output of the edge detection circuit 131, an inverter 133 for delivering, to the edge detection circuit 132, a clock obtained by inverting master clock MCK from the master clock generating section 14, a decoder 134 supplied with output of the V-counter 132, an edge detection circuit 135 supplied with horizontal synchronizing signal T.G.-HD/IT-HD selected by the switch 16a, a H-counter 136 having data input terminal supplied with output of the edge detection circuit 135, an inverter 137 for delivering, to the edge detection circuit 135 and the H-counter 136, a clock obtained by inverting master clock MCK from the master clock generating section 14, and a decoder 138 supplied with output of the H-counter 136.

The edge detection circuit 131 is composed of two flip-flops 131A, 131B cascade-connected in which respective clock input terminals are supplied with master clock MCK inverted by the inverter 133 and a gate 131C supplied with outputs of the respective flip-flops 131A, 131B, wherein the vertical synchronizing signal T.G.-VD/IT-VD selected by the switch 16b is delivered to the data input terminal of the flip-flop 131A. This edge detection circuit 131 detects falling edge of the vertical synchronizing signal T.G.-VD/IT-VD to deliver, to the data input terminal of the V-counter 132, edge detection output of 1 clock width of the master clock MCK at the timing of the falling edge. In this case, the clock input terminal of the V-counter 132 is supplied with decode output of the decoder 138. Further, this V-counter 132 counts decode output of the decoder 138 on the basis of edge detection output by the edge detection circuit 131 to deliver its count output to the decoder 134.

Further, the edge detection circuit 135 is composed of two flip-flops 135A, 135B cascade-connected in which respective clock input terminals are supplied with master clock MCK inverted by the inverter 137, and a gate 135c supplied with outputs of the respective flip-flops 135A, 135B, wherein horizontal synchronizing signal T.G.-HD/IT-HD selected by the switch 16a is delivered to the data input terminal of the flip-flop 135A. This edge detection circuit 135 detects falling edge of the horizontal synchronizing signal T.G.-HD/IT-HD to deliver, to the data input terminal of the H-counter 136, edge detection output of 1 clock width of the master clock MCK at the timing of the falling edge. In this example, the clear input terminal of this H-counter 136 is supplied with decode output of the decoder 134.

The H-counter 136 counts the master clock MCK on the basis of edge detection output delivered from the edge detection circuit 135 to the data input terminal to deliver its count output to the decoder 138.

Further, the decoder 138 decodes count output of the H-counter 136 to thereby generate various kinds of drive timing signals XV1, XV2, XV3, XV4, XSG1, XSG2, PG, H1, H2 of the CCD image sensor 11.

Figure 10:
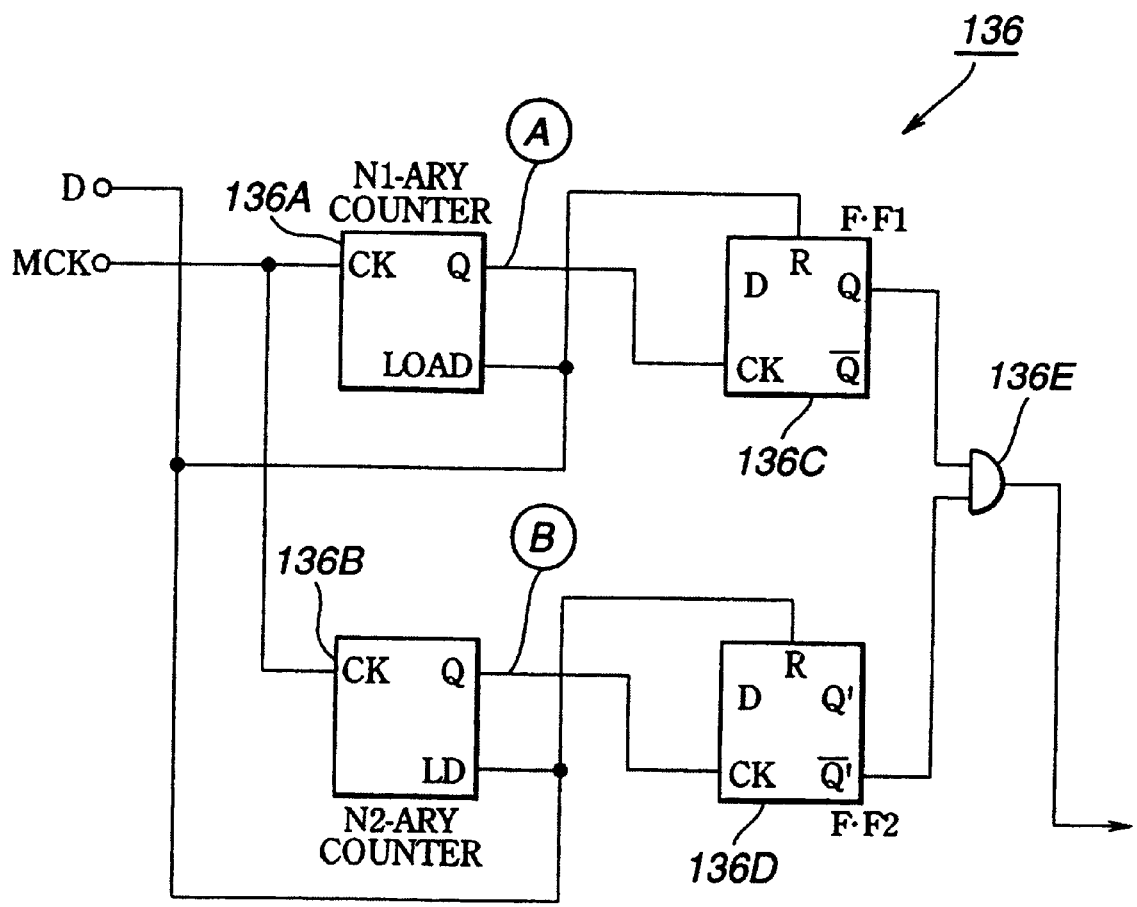
FIG. 10 is a block diagram showing the configuration of H-counter in the timing generator.

In this example, the H-counter 136 comprises, as shown in FIG. 10, counters 136A, 136B in which edge detection output by the edge detection circuit 135 is delivered to respective load terminals, flip-flops 136C, 136D in which the edge detection output is delivered to respective reset terminals, and a gate 136E supplied with respective outputs Q, $\overline{Q}'$ of the flip-flops 136C, 136D.

Figure 11:
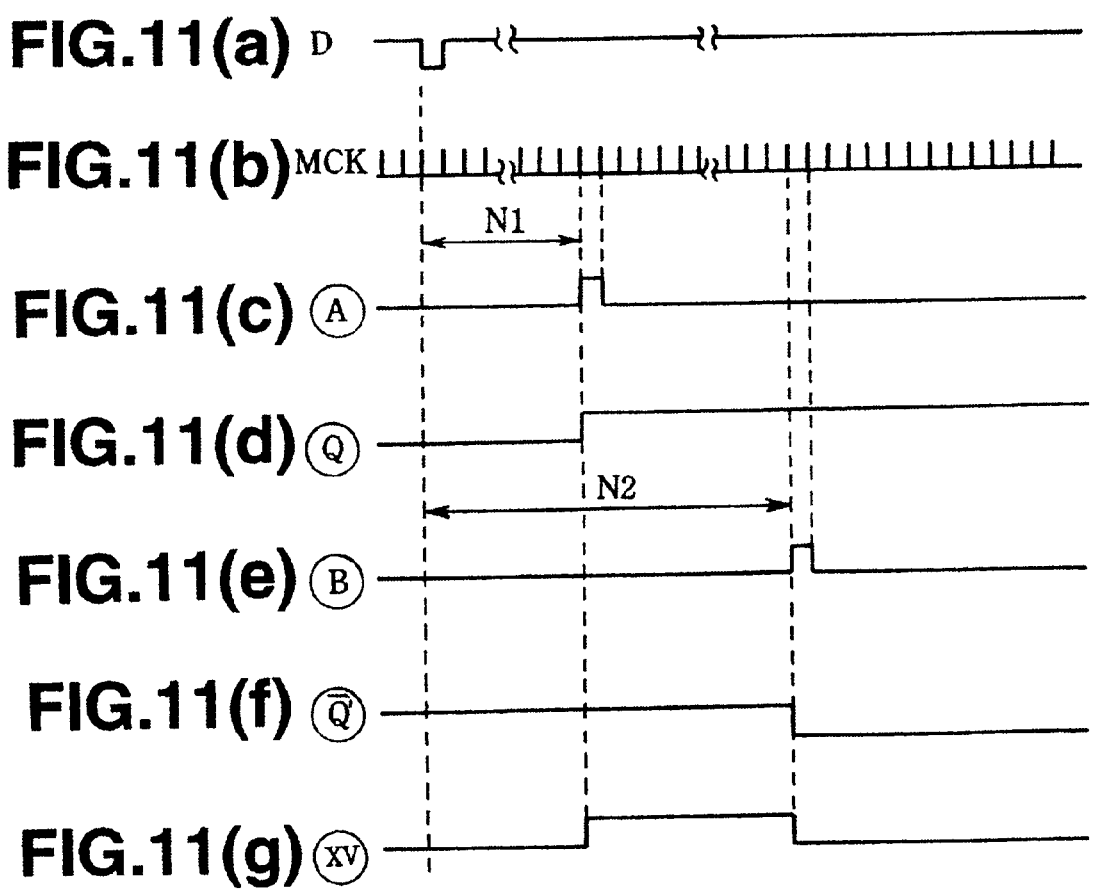
FIG. 11 is a time chart showing the operation of the H-counter.

The counter 136A is N1-ary counter for counting the master clock MCK, and is supplied at the clock input terminal with master clock MCK as shown in FIG. 11(b) which is inverted by the inverter 137. This counter 136A is operative so that in the case where period of the edge detection output shown in FIG. 11(a) which is delivered to its load terminal is longer than N1, it delivers, to the clock input terminal of the flip-flop 136C, single pulse A at the time point when N1 count operations have been completed as shown in FIG. 11(c) as its count output. The flip-flop 136C delivers, to the gate 136E, output Q as shown in FIG. 11(d) of which state is inverted by count output from the counter 136A.

Moreover, the counter 136B is N2 (N1<N2)-ary counter for counting the master clock MCK, and is supplied at its clock input terminal with master clock MCK as shown in FIG. 11(b) which is inverted by the inverter 137. This counter 136B is operative so that in the case where period of the edge detection output shown in FIG. 11(a) which is delivered to its load terminal is longer than N2, it delivers, to the clock input terminal of the flip-flop 133D, single pulse B at the time point when N2 count operations have been completed as shown in FIG. 11(e) as its count output. The flip-flop 136D delivers, to the gate 136E, output $\overline{Q}'$ as shown in FIG. 11(f) of which state is inverted by count output from the counter 136B.

Further, the gate 136E is a logical product circuit and serves to form, as logical product output of outputs Q, $\overline{Q}'$ of the respective flip-flops 136C, 136D, output pulse XV as shown in FIG. 11(g) which rises after N1 count operations have been completed from the timing of falling of edge detection output by the edge detection circuit 135 and falls after N2 count operations have been completed.

In the H-counter 136 of such a configuration, when the period of the edge detection output by the edge detection circuit 135 becomes shorter than N1 (in the case where, e.g., N1 is 40 count operations and the period of the edge detection output is 4), outputs Q, $\overline{Q}'$ of the respective flip-flops 136C, 136D are caused to be both at low level, and the output pulse XV also disappears.

Figure 12:
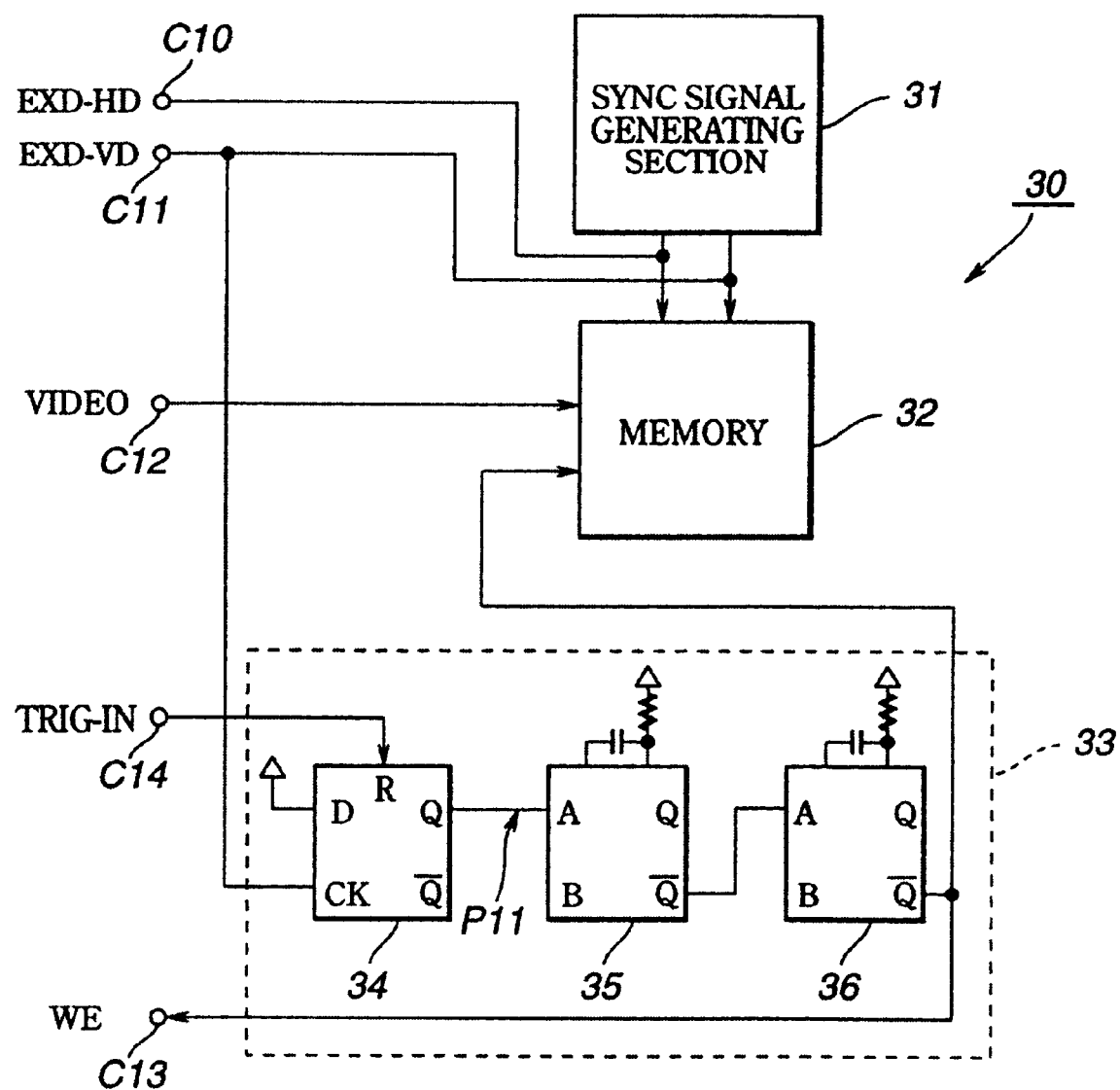
FIG. 12 is a block diagram showing the configuration of write enable signal preparation section of picture taking-in unit in the imaging system.

Further, the write enable signal preparation section 33 of the picture taking-in unit 30 comprises, as shown in FIG. 12, for example, a flip-flop 34 supplied at its clock terminal CK with external vertical synchronizing signal EXT-VD and reset by the trigger pulse signal TRIG-IN delivered from the pulse width adjustable setting circuit 5 through terminal C14, and mono-multi vibrators 35, 36 for forming pulses of respective predetermined widths from output of the flip-flop 34 to generate write enable signal WE corresponding to the trigger pulse signal TRIG-IN delivered to the terminal C14 to deliver it to the memory 32 and to deliver it to the control unit 20 through the terminal C13.

Figure 13:
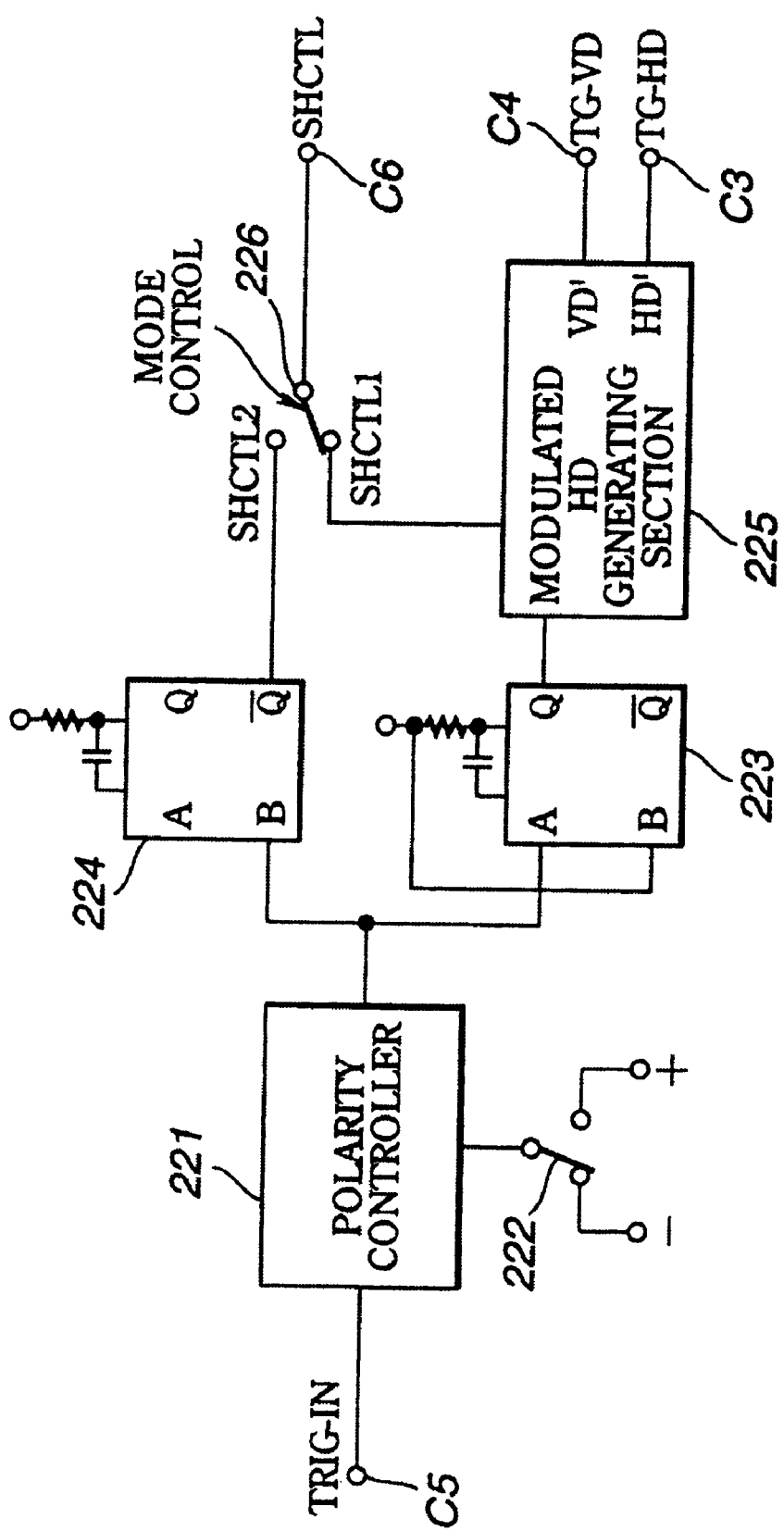
FIG. 13 is a block diagram showing the configuration of modulated HD signal preparation section of control unit in the imaging system.

On the other hand, the modulated HD signal preparation section 22 of the control unit 20 comprises, as shown in FIG. 13, for example, a polarity control circuit 221 supplied with trigger pulse signal TRIG-IN through the terminal C5 from the pulse width adjustable setting circuit 5, two mono-multi vibrators 223, 224 triggered by output of the polarity control circuit 221, a modulated HD signal generator 225 supplied with output of the mono-multi vibrator 223, and a shutter changeover switch 226 supplied with output of the modulated HD signal generator 225 and output of the mono-multi vibrator 224.

Figure 14:
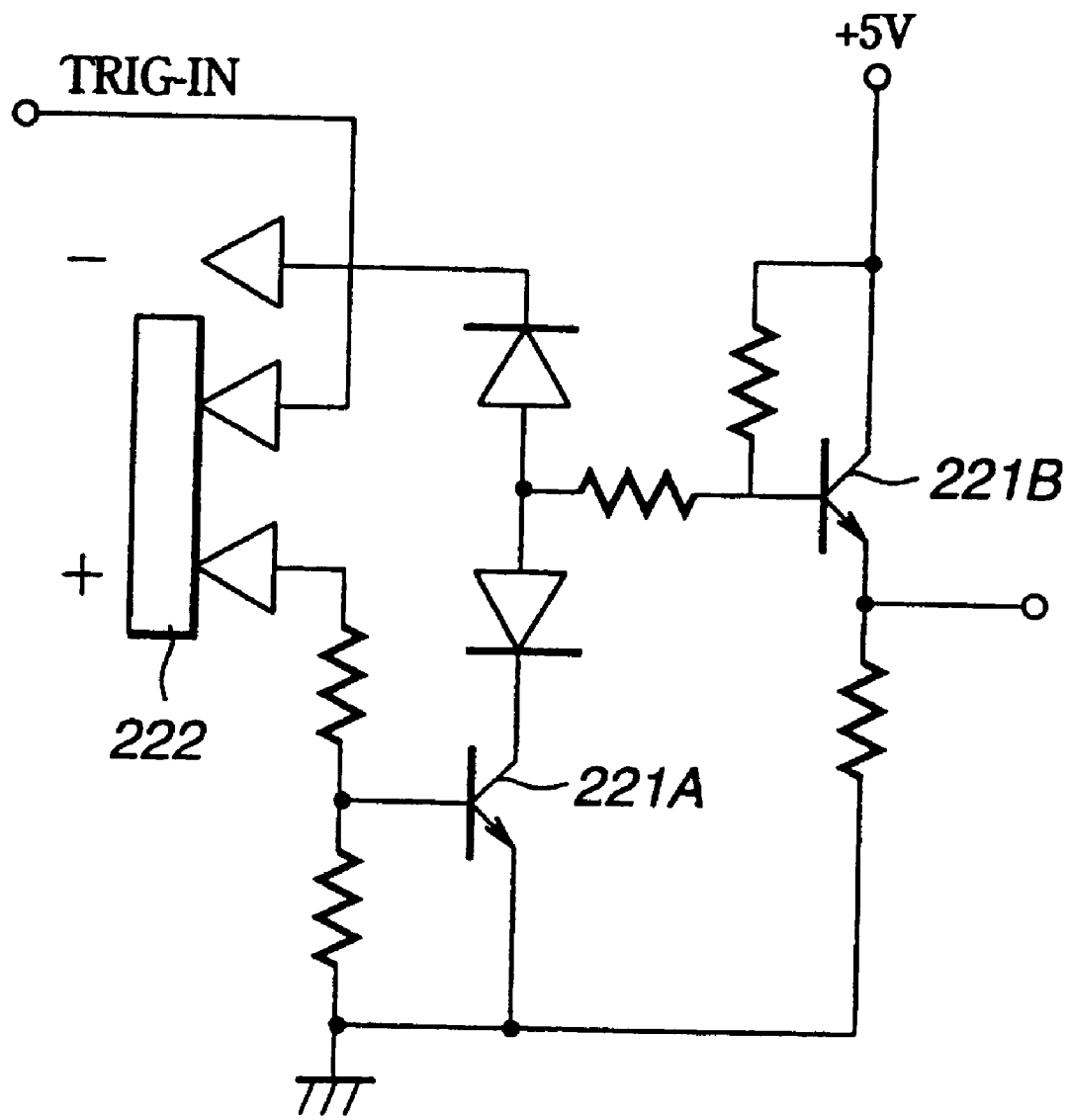
FIG. 14 is a circuit diagram showing more practical configuration of polarity control circuit of the modulated HD signal preparation section.

The polarity control circuit 221 serves to output, in dependency upon setting state of a polarity designation switch 222, inverted trigger pulse signal in which polarity of the trigger pulse signal TRIG-IN is inverted, or non-inverted trigger pulse signal. This polarity control circuit 221 is composed, as its more practical configuration is shown in FIG. 14, for example, of, e.g., a polarity inverting circuit by, e.g., NPN transistor 221A, and an emitter follower circuit by NPN transistor 221B. The polarity control circuit 221 shown in FIG. 14 is operative so that the trigger pulse signal TRIG-IN is selectively delivered to respective bases of the NPN transistors 221A, 221B through the polarity designation switch 222.

Further, in the state where the polarity designation switch 222 is set so as to deliver trigger pulse signal TRIG-IN to the base of the NPN transistor 221A constituting the polarity inverting circuit, inverted trigger pulse signal obtained by inverting polarity of the trigger pulse signal TRIG-IN by the polarity inverting circuit comprised of the NPN transistor 221A is outputted through the emitter follower circuit comprised of the NPN transistor 221B. In addition, in the state where the polarity designation switch 222 is set so as to deliver trigger pulse signal TRIG-IN to the base of the NPN transistor 221B constituting the emitter follower circuit, the trigger pulse signal TRIG-IN is outputted through the emitter follower circuit comprised of the NPN transistor 221B as non-inverted trigger pulse signal as it is.

In this example, at the time of the random shutter mode, the polarity designation switch 222 is set so as to deliver trigger pulse signal TRIG-IN to the base of the NPN transistor 221A constituting the polarity inverting circuit. Thus, at the time of the random shutter mode, an inverted trigger pulse signal as shown in FIG. 15(b) is obtained by the polarity control circuit 221 from trigger pulse signal TRIG-IN as shown in FIG. 15(a).

The mono-multi vibrator 223 is triggered by rising edge of output of the polarity control circuit 221 to deliver a camera trigger signal of a predetermined pulse width to the modulated HD signal generator 225 as its output. Thus, at the time of the random shutter mode, the mono-multi vibrator 223 is triggered by the rising edge of the inverted trigger pulse signal, i.e., the trailing edge of the inverted trigger pulse signal. As a result, a camera trigger signal as shown in FIG. 15(c) is delivered to the modulated HD signal generator 225.

Moreover, the modulated HD signal generator 225 is operative with the rising edge, i.e., the leading edge of the camera trigger signal delivered from the mono-multi vibrator 223 being as reference to output modulated synchronizing signals T.G.-VD, T.G.-HD as shown in FIGS. 15(d), (e) to the terminals C4, C3 and to deliver a first shutter control signal as shown in FIG. 15(f) synchronous with the rising edge of the camera trigger signal to the shutter changeover switch 226.

Further, the mono-multi vibrator 224 is triggered by falling edge of output of the polarity control circuit 221 to deliver a second shutter control signal of a predetermined pulse width to the shutter changeover switch 226 as its output. Thus, at the time of the random shutter mode, the mono-multi vibrator 224 is triggered by falling edge of the inverted trigger pulse signal, i.e., the leading edge of the inverted trigger pulse signal to deliver a second shutter control signal as shown in FIG. 15(g) synchronous with the leading edge of the inverted trigger pulse signal to the shutter changeover switch 226.

The shutter changeover switch 226 is caused to undergo switching setting operation so that in the case of the ordinary random shutter mode where no external control of the exposure time is carried out, it outputs a first shutter control signal SHCTL1 generated by the modulated HD signal generator 225 to the terminal C6, while in the case of the random shutter mode where external control of the exposure time is carried out, it outputs a second shutter control signal SHCLTL2 generated by the mono-multi vibrator 224 to the terminal C6.

In this case, since the effective exposure time period in the CCD camera 10 is the time period from the timing of shutter control signal SHCTL at which charges stored in respective pixels of the light receiving portions are last swept out up to the timing of the read-out signal as described above, the above-mentioned effective exposure time period is the time period T1 from the rising edge of the first shutter control signal SHCTL1 outputted as the shutter control signal SHCTL up to the rising edge of the read-out signal in the ordinary random shutter mode where no external control of exposure time is carried out. It is to be noted that since the effective exposure time period T1 in the ordinary random shutter mode is time from the timing of falling edge of modulated vertical synchronizing signal T.G.-VD synchronous with the trailing edge of the trigger pulse signal TRIG-IN up to the time when the modulated horizontal synchronizing signal T.G.-HD is counted by a predetermined number of pulses so that read-out signal is formed, frequency of the modulated horizontal synchronizing signal T.G.-HD is adjusted, thereby making it possible to adjustably set the effective exposure time period T1 with high accuracy.

Further, in the case of the random shutter mode where external control of exposure time is carried out, since the second shutter control signal SHCTL2 generated by the mono-multi vibrator 224 is outputted as shutter control signal SHCTL, the time period from the rising edge of the second shutter control signal SHCTL2 up to the rising edge of the read-out signal is caused to be effective exposure time period T3. Since this effective exposure time period T3 corresponds to sum of the time period T2 corresponding to the pulse width W of the trigger pulse signal TRIG-IN and the effective exposure time period T1 in the ordinary random shutter mode, the pulse width W of the trigger pulse signal TRIG-IN that the pulse width adjustable setting circuit 5 outputs is varied, thereby making it possible to continuously adjustably set the effective exposure time period T3 over a broad range. In this example, the effective exposure time period T1 is set to minimum value (e.g., 1/1000 sec.), thereby making it possible to externally control the effective exposure time period T3 with good accuracy up to 1/10000 sec. only by setting of the time period T2.

Further, the write enable signal preparation section 33 of the picture taking-in unit 30 is operative so that when trigger pulse signal TRIG-IN shown in FIG. 16(a) is delivered from the pulse width adjustable setting circuit 5, it generates write enable signal WE shown in FIG. 16(d) in synchronism with external vertical synchronizing signal EXT-VD shown in FIG. 16(b) which is delivered immediately after to deliver this write enable signal WE to the memory 32, and to deliver it to the modulated HD signal preparation section 22 of the control unit 20 through the terminal C9.

In more practical sense, the flip-flop 34 of the write enable signal preparation section 33 is reset by the trigger pulse signal TRIG-IN delivered to the terminal C14, and is operative with the external vertical synchronizing signal EXT-VD from the external synchronizing signal generating section 31. being as clock. Namely, as shown in FIG. 16(c), output P11 of this flip-flop 34 is caused to be at low level for the time period from the time when the trigger pulse signal TRIG-IN is delivered up to termination of the first external vertical synchronizing signal EXT-VD.

Further, the write enable signal WE is shaped by the mono-multi vibrators 35, 36 on the basis of the timing of the rising edge of the output P11 of this flip-flop 34. The shaped write enable signal thus obtained is delivered to the memory 32 and the terminal 13.

Further, the modulated HD signal preparation section 22 in the control unit 20 is supplied with field judgment signal FLD for discriminating fields of synchronizing signals SG-HD, SG-VD shown in FIG. 17(f) from the synchronizing signal generating section 21. In addition, as shown in FIG. 17(e), CL/4 signal is delivered to the CCD camera 10 as modulated horizontal synchronizing signal T.G.-HD for the vertical transfer stop time period during which transfer of the vertical transfer register of the CCD image sensor 11 is stopped.

Additionally, FIG. 17(a) shows trigger pulse signal TRIG-IN, FIG. 17(b) shows modulated vertical synchronizing signal T.G.-VD, and FIG. 17(f) shows video signal VIDEO outputted from the CCD camera 10.

Further, sum of the charges which have been read out to the vertical transfer section as described above is determined every two pixels adjacent in upper and lower directions on the basis of control from the timing generator 13. Further, the timing generator 13 is operative so that in the case where, e.g., horizontal synchronizing signal SG-HD shown in FIG. 18(a) is delivered thereto, it generates vertical transfer signals XV1, XV2, XV3, XV4 shown in FIGS. 18(d) to (g) every predetermined time interval. In this example, charges transferred to the vertical transfer sections are transferred in the vertical direction by the well known 4-phase drive system.

In more practical sense, the timing generator 13 carries out 44 count operations of clock pulses CL shown in FIG. 18(c) obtained by halving, in terms of frequency, the master clock MCK of about 28 MHz delivered from the master clock generating section 14 shown in FIG. 18(b) from the timing at which the horizontal synchronizing signal SG-HD is caused to be at low level thereafter to allow the vertical transfer signal XV1 to be at high level to further carry out 27 count operations of clock pulses CL from that time point thereafter to allow the vertical transfer signal XV1 to be at low level. Further, at the timing generator 13, count operation of the clock CL is carried out by the H-counter 136 which is reset by the above-described horizontal synchronizing signal SG-HD.

Meanwhile, as described above, CL/4 signal is included in the modulated horizontal synchronizing signal T.G.-HD. For this reason, in the case where the modulated horizontal synchronizing signal T.G.-HD is delivered to the timing generator 13, the H-counter 136 which counts the clock CL is reset every four periods of the clock CL for the time period during which the CL/4 signal shown in FIG. 19(b) is delivered, i.e., the vertical transfer stop time period. As a result, it is impossible to carry out 44 count operations of clock pulses CL. For this reason, for the time period during which CL/4 signal is delivered as the modulated horizontal synchronizing signal T.G.-HD, this timing generator 13 does not form vertical transfer signals XV1 to XV4. Namely, for this time period, vertical transfer is stopped at the vertical transfer section of the CCD image sensor 11. Additionally, FIG. 19(a) shows ordinary horizontal synchronizing signal SG-HD, and FIG. 19(c) shows vertical transfer signal XV1.

In this imaging system, as described above, the CL/4 signal is delivered as the modulated horizontal synchronizing signal T.G.-HD to thereby stop vertical transfer of charges at the vertical transfer section of the CCD image sensor 11. Further, supply of CL/4 signal as the modulated horizontal synchronizing signal T.G.-HD is stopped, as shown in FIG. 17(e), at the timing of rising of the vertical synchronizing signal VD immediately after rising of the first field discrimination signal FLD after the write enable signal WE is delivered. The timing generator 13 starts generation of the vertical transfer signals XV1 to XV4 at this timing to deliver the vertical transfer signals XV1 to XV4 thus generated to the CCD image sensor 11 through the vertical drive section 12.

Further, the vertical transfer sections of the CCD image sensor 11 transfer charges in succession on the basis of vertical transfer signals XV1 to XV4 delivered thereto to output them as image pick-up signal. Thus, the image pick-up signal synchronous with the vertical synchronizing signal T.G.-VD of the first ODD field after the write enable signal WE is delivered is outputted from the CCD image sensor 11.

In this imaging system, there is employed as described above such an approach to control the timing for stopping supply of the CL/4 signal as the modulated horizontal synchronizing signal T.G.-HD to thereby control vertical transfer of the vertical transfer sections of the CCD image sensor 11 to control timing of output of the image pick-up signal at the timing corresponding to the write enable signal WE from the picture taking-in unit 30.

In this imaging apparatus, as described above, moving object 2 is detected by position sensor 3 to generate trigger pulse signal TRIG-IN by pulse width adjustable setting circuit 5 on the basis of that timing thus to control the image pick-up timing of the CCD camera 10 on the basis of the trigger pulse signal TRIG-IN.

Further, as described above, the modulated HD signal preparation section 22 of the control unit 20 generates shutter control signal SHCTL having a predetermined pulse width on the basis of the trigger pulse signal TRIG-IN delivered to the terminal C5 to deliver this shutter control signal SHCTL to the CCD camera 10 through the terminal C6.

Further, as described above, the modulated HD signal preparation section 22 is operative so that when the trigger pulse signal TRIG-IN is delivered thereto from the terminal C5, it conducts a control to generate modulated horizontal synchronizing signal T.G.-HD and modulated vertical synchronizing signal T.G.-VD on the basis of external synchronizing signals EXT-HD, EXT-VD from the synchronizing signal generating section 21, and to insert, for the vertical transfer stop time period, CL/4 signal into the modulated horizontal synchronizing signal T.G.-HD on the basis of the write enable signal WE from the picture taking-in unit 30 to stop transfer of charges at the vertical transfer sections of the CCD image sensor 11.

Further, the timing generator 13 of the CCD camera 10 delivers a read-out signal to the CCD image sensor 11 so as to read out charges stored in the light receiving portions of the CCD image sensor 11 to the vertical transfer section after a predetermined charge storage time is expired.

Further, as described above, the timing generator 13 delivers vertical transfer signals XV1 to XV4 to the vertical transfer sections of the CCD image sensor 11 at the timing where the CL/4 signal in the modulated horizontal synchronizing signal T.G.-HD is completed. Thus, the CCD image sensor 11 sequentially outputs, as image pick-up signal, charges which have been read out to the vertical transfer sections. This image pick-up signal is caused to be video signal through the CDS 18 and the process processing section 19. The video signal thus obtained is delivered to the picture taking-in unit 30.

As is clear from the foregoing description, in this imaging system, it is possible to control, on the basis of the write enable signal WE from the picture taking-in unit 30, the timing at which video signal is outputted from the CCD camera 10 on the basis of the trigger pulse signal TRIG-IN from the pulse width adjustable setting circuit 5. For this reason, in this imaging system, it is possible to arbitrarily set the timing at which video signal is outputted from the CCD camera 10 for convenience of the picture taking-in unit 30. Accordingly, the picture taking-in unit 30 can securely take picture whereinto.

Figure 20:
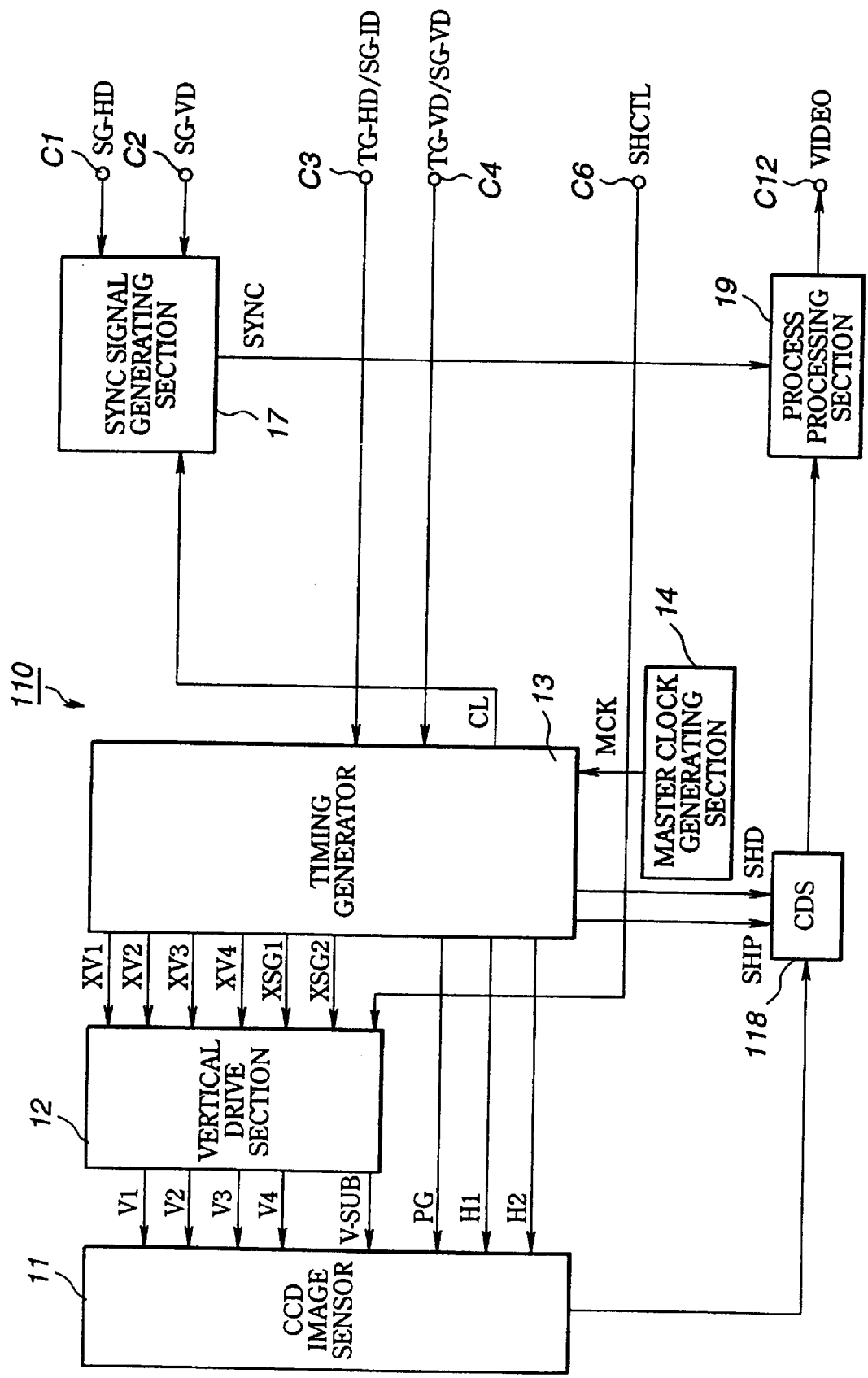
FIG. 20 is a block diagram showing another configuration of CCD camera in the imaging system to which this invention is applied.

Further, in the above-described imaging system shown in FIG. 4, switching operations of switches 16*a*, 16*b* provided at the CCD camera 10 are carried out to thereby carry out switching between the ordinary operation mode for carrying out image pick-up of moving picture on the basis of internal synchronizing signals IT-HD, IT-VD from the timing generator 13 and the random shutter mode for carrying out image pick-up operation of still picture in accordance with modulated synchronizing signals T.G.-HD, T.G.-VD delivered to the terminals C3, C4. However, the above-mentioned switches 16*a*, 16*b* are omitted and there may be employed a configuration in which the terminals C3, C4 are directly connected to the timing generator 13 as in the case of CCD camera 110 shown in FIG. 20, for example, to selectively deliver the modulated synchronizing signals T.G.-HD, T.G.-VD or the ordinary synchronizing signals SG-HD, SG-VD to the timing generator 13 through the terminals C3, C4 from the control unit 20 side to carry out switching of the operation mode at the control unit 20 side.

Figure 21:
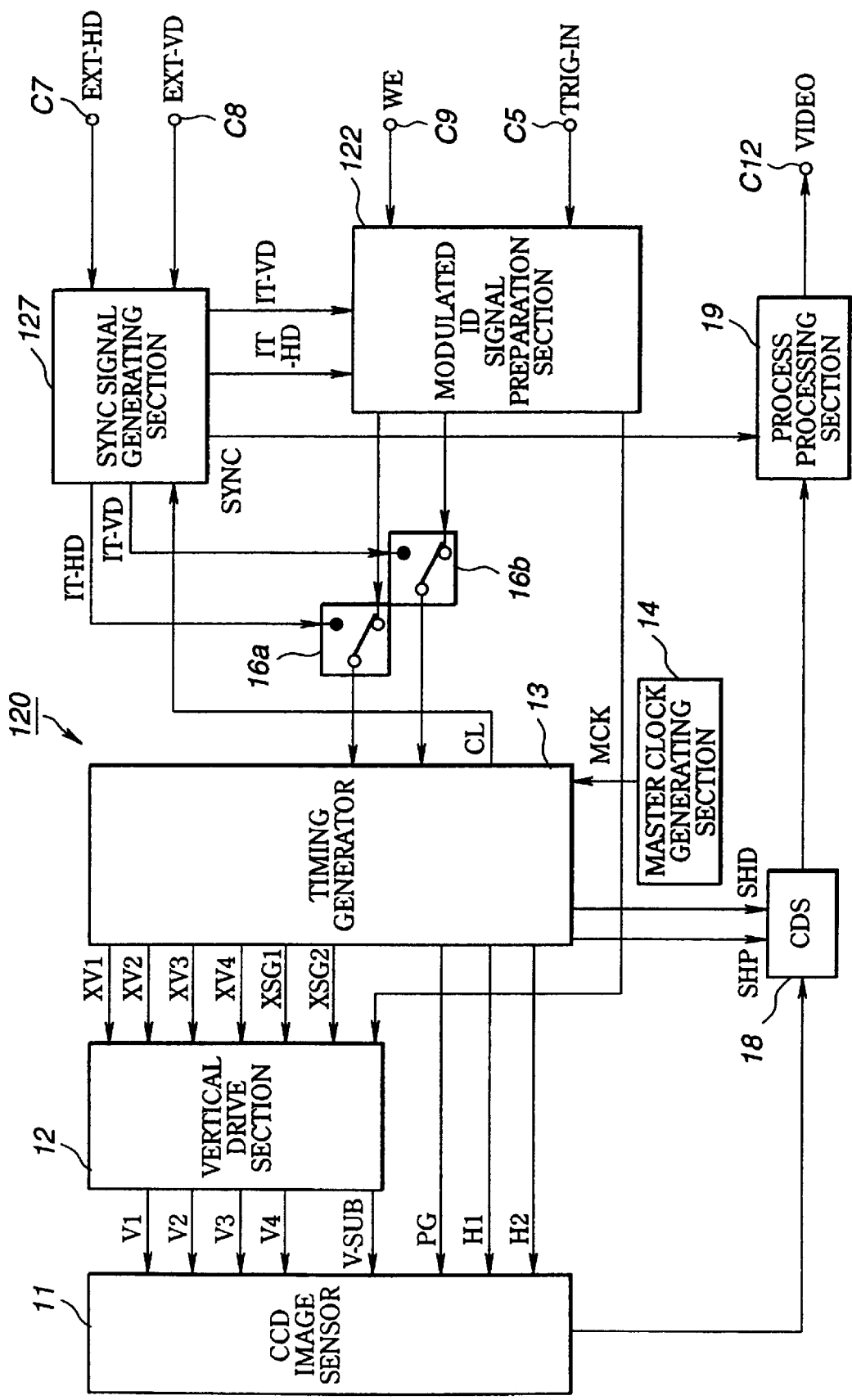
FIG. 21 is a block diagram showing a further configuration of CCD camera in the imaging system to which this invention is applied.

Further, in the above-described imaging system shown in FIG. 4, control of the operation of the CCD camera 10 is conducted by the control unit 20 to take video signal from the CCD camera 10 into the picture taking-in unit 30. However, there may be employed, a configuration in which it is unnecessary that the control unit 20 and the CCD camera 10 are separately provided, e.g., a configuration in which the CCD camera 10 is caused to have the function of the control unit 20 like CCD camera 120 shown in FIG. 21.

Namely, the CCD camera 120 shown in FIG. 18 is adapted so that the modulated signal generating section 21 and the modulated signal preparation section 22 constituting the control unit 20 in the above-described imaging system shown in FIG. 4 are provided at the CCD camera 10 side, and comprises terminals C7, C8 supplied with external synchronizing signals EXT-HD, EXT-VD from the above-described picture taking-in unit 30, a terminal C9 supplied with write enable signal WE from the picture taking-in unit 30, a synchronizing signal generating section 127 for generating internal synchronizing signals IT-HD, IT-VD on the basis of external synchronizing signals EXT-HD, EXT-VD delivered from the picture taking-in unit 30 to the terminals C7, C8 to deliver these internal synchronizing signals IT-HD, IT-VD to the timing generator 13 through switches 16*a*, 16*b*, and a modulated HD signal preparation section 122 for preparing modulated synchronizing signals T.G.-HD, T.G.-VD on the basis of the internal synchronizing signals IT-HD, IT-VD from the synchronizing signal generating section 127 and the write enable signal WE, etc. delivered to the terminal C9 to deliver these modulated synchronizing signals T.G.-HD, T.G.-VD to the timing generator 13 through the switches 16*a*, 16*b*.

By using CCD camera 120 of such a configuration, in the above-described imaging system shown in FIG. 4, the control unit 20 is omitted to simplify the configuration, thereby making it possible to control the timing at which video signal is outputted from the CCD camera 120 for convenience of the picture taking-in unit 30. Thus, the picture taking-in unit 30 can securely take picture whereinto.

What is claimed is:

1. An imaging apparatus comprising:

a solid-state image pick-up device including light receiving means adapted for producing charges corresponding to quantity of light incident thereto, vertical transfer means to which charges produced at the light receiving means are transferred, horizontal transfer means for outputting the charges transferred through the vertical transfer means, and a charge sweep-out section for sweeping out the charges stored in the light receiving means in accordance with a control signal;

trigger signal generating means for generating a trigger signal;

pulse width adjustable setting means for generating a trigger pulse signal of which pulse width can be adjustably set;

signal generating means for outputting a first shutter control signal in which the trailing edge of the trigger pulse signal is caused to be the timing of reference, a second shutter control signal in which the leading edge of the trigger pulse signal is caused to be the timing of reference and a synchronizing signal in which the trailing edge of the trigger pulse signal is caused to be the timing of reference;

signal selector means for selectively outputting one of the first shutter control signal and the second shutter control signal;

drive signal generating means for outputting, on the basis of the timing of the synchronizing signal, a read-out signal for transferring charges stored in the light receiving means to the vertical transfer means and a transfer signal for outputting, through the horizontal transfer means, the charges which have been read out to the vertical transfer means; and drive means for driving the solid-state image pick-up device on the basis of the first shutter control signal or the second shutter control signal selected by the signal selector means, the read-out signal and the transfer signal, whereby an image pick-up operation of an object is performed with an effective exposure time period corresponding to pulse width of the trigger pulse signal.

2. An imaging apparatus as set forth in claim 1, wherein the signal generating means comprises internal synchronizing signal generating means for generating an internal synchronizing signal, modulated synchronizing signal generating means for generating a shutter control signal in which the leading edge of the trigger pulse signal is caused to be timing of reference and a synchronizing signal in which the trailing edge of the trigger pulse signal is caused to be timing of reference, and signal selector means for selectively outputting either one of the internal synchronizing signal and the synchronizing signal; and the drive signal generating means outputs the read-out signal and the transfer signal on the basis of the internal synchronizing signal or the synchronizing signal selected by the signal selector means.

3. An imaging apparatus as set forth in claim 1, wherein the solid-state image pick-up device is interline transfer type solid-state image pick-up device.

4. An imaging apparatus comprising:

a solid-state image pick-up device including light receiving means adapted for producing charges corresponding to quantity of light incident thereto, vertical transfer means to which the charges which have been produced at the light receiving means are transferred, horizontal transfer means for outputting the charges which have been transferred through the vertical transfer means, and charge sweep-out means for sweeping out the charges stored in the light receiving means in accordance with a control signal;

trigger signal generating means for outputting a trigger signal;

pulse width adjustable setting means for generating, on the basis of the input timing of the trigger signal, a trigger pulse signal of which pulse width can be adjustably set;

signal generating means for outputting a first shutter control signal generated on the basis of the timing of the trailing edge of the trigger pulse signal, a second shutter control signal generated on the basis of the timing of the leading edge of the trigger pulse signal, and a synchronizing signal generated on the basis of the timing of the trailing edge of the trigger pulse signal;

signal selector means for selectively outputting one of the first shutter control signal and the second shutter control signal;

drive signal generating means for generating, on the basis of the synchronizing signal, a read-out signal for transferring the charges stored in the light receiving means to the vertical transfer means and a transfer signal for outputting, through the horizontal transfer means, the charges which have been read out to the vertical transfer means; and drive means for driving the solid-state image pick-up device on the basis of the first shutter control signal or the second shutter control signal selected by the signal selector means, the read-out signal and the transfer signal, whereby an image pick-up operation of an object is performed with an effective exposure time period which corresponds to one of: (i) a time period (T1) from a rising edge of the first shutter control signal up to a rising edge of the read-out signal, and (ii) a time period (T3) from a rising edge of the second shutter control signal up to the rising edge of the read-out signal, wherein the time period (T3) corresponds to the sum of a time period (T2), which corresponds to the pulse width of the trigger pulse signal, and the time period (T1).

5. An imaging apparatus as set forth in claim 4,
wherein the signal generating means comprises internal synchronizing signal generating means for generating an internal synchronizing signal, modulated synchronizing signal generating means for generating a shutter control signal in which the leading edge of the trigger pulse signal is caused to be timing of reference and a synchronizing signal in which the trailing edge of the trigger pulse signal is caused to be timing of reference, and signal selector means for selectively outputting either one of the internal synchronizing signal and the synchronizing signal; and the drive signal generating means outputs the read-out signal and the transfer signal on the basis of the internal synchronizing signal or the synchronizing signal selected by the signal selector means.

6. An imaging apparatus as set forth in claim 4,
wherein the solid-state image pick-up device is interline transfer type solid-state image pick-up device.

7. A control device for an imaging apparatus, comprising:
detecting means for detecting an object to output a detection signal;
pulse width adjustable setting means for outputting, on the basis of the detection signal, a trigger pulse signal of which pulse width can be adjustably set;

signal generating means for generating a first shutter control signal in which the trailing edge of the trigger pulse signal is caused to be the timing of reference, a second shutter control signal in which the leading edge of the trigger pulse signal is caused to be the timing of reference and a synchronizing signal in which the trailing edge of the trigger pulse signal is caused to be the timing of reference; and signal selector means for selectively outputting one of the first shutter control signal and the second shutter control signal, whereby the synchronizing signal and one of the first shutter control signal and the second shutter control signal is delivered to the imaging apparatus and an image pick-up operation is performed with an exposure time period which corresponds to pulse width of the trigger pulse signal.

8. A control device for an imaging apparatus as set forth in claim 7,
wherein the signal generating means comprises internal synchronizing signal generating means for generating an internal synchronizing signal, modulated synchronizing signal generating means for generating a shutter control signal in which the leading edge of the trigger pulse signal is caused to be timing of reference and a synchronizing signal in which the trailing edge of the trigger pulse signal is caused to be timing of reference, and signal selector means for outputting either one of the internal synchronizing signal and the synchronizing signal.

9. A control device for an imaging apparatus, comprising:
detecting means for detecting an object to output a detection signal;
pulse width adjustable setting means for generating, on the basis of the detection signal, a trigger pulse signal of which pulse width can be adjustably set;
signal generating means for outputting a first shutter control signal generated on the basis of the timing of the trailing edge of the trigger pulse signal, a second shutter control signal generated on the basis of the timing of the leading edge of the trigger pulse signal, and a synchronizing signal generated on the basis of the timing of the trailing edge of the trigger pulse signal; and signal selector means for selectively outputting one of the first shutter control signal and the second shutter control signal, whereby the synchronizing signal and one of the first shutter control signal and the second shutter control signal is delivered to the imaging apparatus.

10. A control device for an imaging apparatus as set forth in claim 9,
wherein the signal generating means comprises internal synchronizing signal generating means for generating an internal synchronizing signal, modulated synchronizing signal generating means for generating a shutter control signal in which the leading edge of the trigger pulse signal is caused to be timing of reference and a synchronizing signal in which the trailing edge of the trigger pulse signal is caused to be timing of reference, and signal selector means for selectively outputting either one of the internal synchronizing signal and the synchronizing signal.

11. Imaging apparatus comprising:
a solid-state image pick-up device including light receiving means adapted for producing charges corresponding to quantity of light incident thereto, vertical transfer means to which charges produced at the light receiving means are transferred, horizontal transfer means for outputting the charges transferred through the vertical transfer means, and a charge sweep-out section for sweeping out the charges stored in the light receiving means in accordance with a control signal;

trigger signal generating means for generating a trigger signal; pulse width adjustable setting means for generating a trigger pulse signal of which pulse width can be adjustably set;

signal generating means for outputting a first shutter confrol signal in which the trailing edge of the trigger pulse signal is caused to be a reference timing, a second shutter control signal in which the leading edge of the trigger pulse signal is caused to be the reference timing and a synchronizing signal in which the trailing edge of the trigger pulse signal is caused to be a reference timing;

drive signal generating means for outputting, on the basis of the timing of the synchronizing signal, a read-out signal for transferring charges stored in the light receiving means to the vertical transfer means and a transfer signal for outputting, through the horizontal transfer means, the charges which have been read out to the vertical transfer means; and drive means for driving the solid-state image pick-up device on the basis of the first shutter control signal or the second shutter control signal, the read-out signal and the transfer signal, whereby an image pick-up operation of an object is performed with an effective exposure time period corresponding to pulse width of the trigger pulse signal.

12. Imaging apparatus comprising:

a solid-state image pick-up device including light receiving means adapted for producing charges corresponding to quantity of light incident thereto, vertical transfer means to which the charges which have been produced at the light receiving means are transferred, horizontal transfer means for outputting the charges which have been transfened through the vertical transfer means, and charge sweep-out means for sweeping out the charges stored in the light receiving means in accordance with a control signal;

trigger signal generating means for outputting a frigger signal; pulse width adjustable setting means for generating, on the basis of the input timing of the trigger signal, a trigger pulse signal whose pulse width can be adjustably set;

signal generating means for outputting a first shutter control signal generated on the basis of the timing of the trailing edge of the trigger poise signal, a second shutter control signal generated on the basis of the timing of the leading edge of the trigger pulse signal, and a synchronizing signal generated on the basis of the timing of the trailing edge of the trigger pulse signal;

drive signal generating means for generating, on the basis of the synchronizing signal, a read-out signal for transferring the charges stored in the light receiving means to the vertical transfer means and a transfer signal for outputting, through the horizontal transfer means, the charges which have been read out to the vertical transfer means; and drive means for driving the solid-state image pick-up device on the basis of the first shutter control signal or the second shutter control signal, the read-out signal and the transfer signal, whereby an image pick-up operation of an object is performed with an effective exposure time period which corresponds to one of: (i) a time period (T1) from a rising edge of the first shutter control signal up to a rising edge of the read-out signal, and (ii) a time period (T3) from a rising edge of the second shutter control signal up to the rising edge of the read-out signal, wherein the time period (T3) corresponds to the sum of a time period (T2), which corresponds to the pulse width of the trigger pulse signal, and the time period (T1).

13. A control device for an imaging apparatus, comprising:

detecting means for detecting an object to output a detection signal;

pulse width adjustable setting means for outputting, on the basis of the detection signal, a trigger pulse signal of which pulse width can be adjustably set; and signal generating means for generating a first shutter contol signal in which the trailing edge of the trigger pulse signal is caused to be a reference timing therefor, a second shutter control signal in which the leading edge of the trigger pulse signal is caused to be the reference limting therefor and a synchronizing signal in which the trailing edge of the trigger pulse signal is caused to be the reference timing therefor;

whereby the synchronizing signal and one of the first shutter control signal and the second shutter control signal is delivered to the imaging apparatus and an image pick-up operation is perfonned with an exposure time period which corresponds to pulse width of the trigger pulse signal.

14. A control device for an imaging apparatus, comprising:

detecting means for detecting an object to output a detection signal; pulse width adjustable setting means for generating, on the basis of the detection signal, a trigger pulse signal whose pulse width can be adjustably set; and signal generating means for outputting a first shutter control signal generated on the basis of the timing of the trailing edge of the trigger pulse signal, a second shutter control signal generated on the basis of the timing of the leading edge of the trigger pulse signal, and a synchronizing signal generated on the basis of the timing of the trailing edge of the trigger pulse signal;

whereby the synchronizing signal and one of the first shutter control signal and the second shutter control signal is delivered to the imaging apparatus.

* * * * *